US010046719B2

(12) United States Patent
Workman et al.

(10) Patent No.: US 10,046,719 B2
(45) Date of Patent: Aug. 14, 2018

(54) MODULAR SHELVING ASSEMBLY

(71) Applicant: MASTERACK MANUFACTURING AND INSTALLATION, LLC, Carthage, MO (US)

(72) Inventors: Bradley P. Workman, Snellville, GA (US); Robert W. Burkhardt, Dacula, GA (US); Jose M. Gamboa, Dunwoody, GA (US); Dennis Bazzy, Douglasville, GA (US); Javier Castillo, Smyrna, GA (US); Jennifer Voelker, Atlanta, GA (US); William Wright, Atlanta, GA (US); Andrew Poole, Decatur, GA (US); Samuel Harris, Norcross, GA (US); H. Shaw Strothers, Chamblee, GA (US)

(73) Assignee: Masterack Manufacturing and Installation, LLC, Decatur, GA (US)

( * ) Notice: Subject to any disclaimer, the term of this patent is extended or adjusted under 35 U.S.C. 154(b) by 105 days.

(21) Appl. No.: 15/139,906

(22) Filed: Apr. 27, 2016

(65) Prior Publication Data
US 2016/0236628 A1 Aug. 18, 2016

Related U.S. Application Data

(63) Continuation of application No. 14/198,966, filed on Mar. 6, 2014, now Pat. No. 9,346,391.

(60) Provisional application No. 61/773,491, filed on Mar. 6, 2013, provisional application No. 61/773,648, filed on Mar. 6, 2013.

(51) Int. Cl.
*B60R 11/06* (2006.01)
*B60P 3/14* (2006.01)
*A47B 47/00* (2006.01)

(52) U.S. Cl.
CPC .......... *B60R 11/06* (2013.01); *A47B 47/0091* (2013.01); *B60P 3/14* (2013.01)

(58) Field of Classification Search
CPC . B60R 11/00; B60R 11/06; B60R 2011/0059; B60P 3/14
USPC .................................. 224/557, 558
See application file for complete search history.

(56) References Cited

U.S. PATENT DOCUMENTS

| 1,691,621 | A | 11/1928 | Young |
| 2,385,559 | A | 9/1945 | Wenthe |
| D206,481 | S | 12/1966 | MacKay |
| 3,527,359 | A | 9/1970 | Ambertson |
| 3,610,429 | A | 10/1971 | MacKay |
| 3,712,697 | A | 1/1973 | Kelley |
| 3,868,123 | A | 2/1975 | Berg et al. |

(Continued)

OTHER PUBLICATIONS

International Search Report and Written Opinion of the International Search Authority, received in International Patent Application No. PCT/US2014/021092, dated Jun. 16, 2014.

*Primary Examiner* — Brian D Nash
(74) *Attorney, Agent, or Firm* — Jackson Walker, LLP

(57) ABSTRACT

A modular shelving assembly for use in a vehicle, including a cargo space at least partially defined by a floor and a side wall of the vehicle, includes at least two interconnected upright assemblies. Each of the upright assemblies includes a first panel, a second panel, and a coupler member separate from and unitizing the first and second panels. The modular shelving assembly further includes a rail secured to one of the floor and the side wall to which at least one of the interconnected upright assemblies is anchored.

19 Claims, 37 Drawing Sheets

(56) References Cited

U.S. PATENT DOCUMENTS

| | | | |
|---|---|---|---|
| 3,963,125 A | 6/1976 | Baggott | |
| D246,773 S | 12/1977 | Bladis | |
| 4,191,436 A | 3/1980 | Cherry | |
| 4,249,295 A * | 2/1981 | Lance | B60R 11/06 29/416 |
| 4,889,377 A | 12/1989 | Hughes | |
| D322,875 S | 12/1991 | Kelley | |
| 5,218,914 A | 6/1993 | Dickinson | |
| 5,398,987 A * | 3/1995 | Sturgis | B60R 9/00 224/404 |
| 5,409,122 A | 4/1995 | Lazarus | |
| 5,466,058 A * | 11/1995 | Chan | A47B 47/0075 312/107 |
| 5,498,048 A * | 3/1996 | Shelby, Jr. | B60P 3/14 296/24.45 |
| D408,953 S | 4/1999 | Golichowski et al. | |
| 5,897,154 A * | 4/1999 | Albertini | B60R 11/06 296/186.4 |
| D429,095 S | 8/2000 | Grosfillex | |
| 6,123,209 A | 9/2000 | Tseng | |
| 6,138,583 A | 10/2000 | Mahone et al. | |
| 6,202,867 B1 | 3/2001 | Di Blasi et al. | |
| D478,739 S | 8/2003 | Sparkowski | |
| D479,925 S | 9/2003 | Hsieh et al. | |
| D493,047 S | 7/2004 | Moon et al. | |
| D497,738 S | 11/2004 | Sparkowski | |
| D525,934 S | 8/2006 | Panasewicz et al. | |
| D534,376 S | 1/2007 | Sparkowski | |
| D536,659 S | 2/2007 | Panasewicz et al. | |
| D549,154 S | 8/2007 | Panasewicz et al. | |
| D553,555 S | 10/2007 | Panasewicz et al. | |
| 7,338,110 B1 | 3/2008 | Eckloff | |
| D565,324 S | 4/2008 | Sparkowski | |
| D573,369 S | 7/2008 | Sparkowski | |
| 7,641,253 B2 | 1/2010 | Steiger et al. | |
| 7,784,885 B2 | 8/2010 | Steiger et al. | |
| D655,107 S | 3/2012 | Clark et al. | |
| D657,591 S | 4/2012 | Sanchez | |
| 8,414,046 B2 | 4/2013 | Pencak et al. | |
| 8,944,483 B2 | 2/2015 | Richter | |
| 2002/0073902 A1 | 6/2002 | Jipp | |
| 2002/0153747 A1 | 10/2002 | Ropp | |
| 2003/0127878 A1 | 7/2003 | Gort et al. | |
| 2005/0127802 A1 | 6/2005 | Chen | |
| 2005/0225108 A1 | 10/2005 | Panasewicz et al. | |
| 2006/0175945 A1 | 8/2006 | Deguchi | |
| 2007/0069542 A1 | 3/2007 | Steiger et al. | |
| 2007/0145865 A1 | 6/2007 | Richter | |
| 2008/0012375 A1 * | 1/2008 | Steiger | B60P 3/14 296/37.6 |
| 2012/0126576 A1 | 5/2012 | Pencak et al. | |

\* cited by examiner

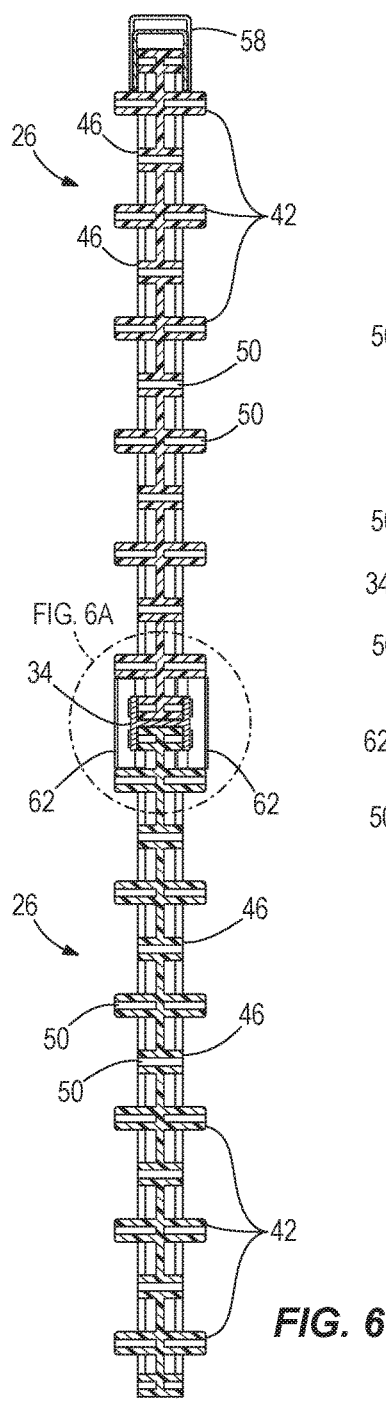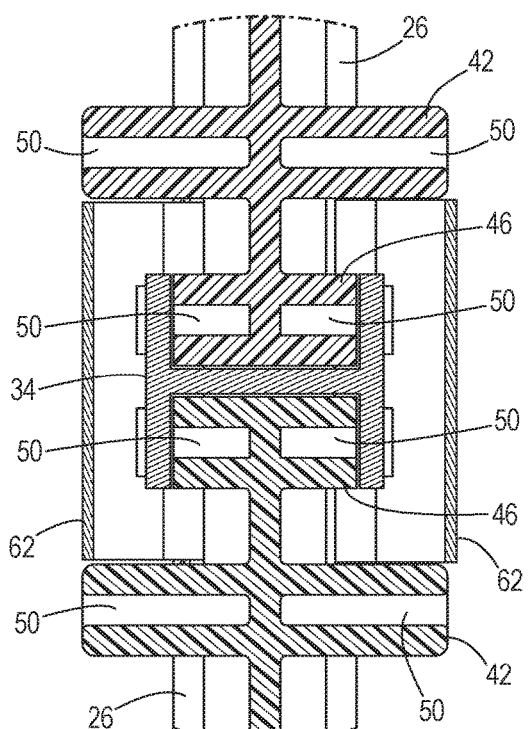
FIG. 6
FIG. 6A

MODULAR SHELVING ASSEMBLY

CROSS-REFERENCE TO RELATED APPLICATIONS

This application is a continuation of co-pending U.S. patent application Ser. No. 14/198,966 filed on Mar. 6, 2014, which claims priority to U.S. Provisional Patent Application Nos. 61/773,491 and 61/773,648 filed on Mar. 6, 2013, the entire contents of all of which are incorporated herein by reference.

FIELD OF THE INVENTION

The present invention relates to a modular shelving assembly and, more particularly, to a modular shelving assembly for use in a utility or cargo vehicle.

BACKGROUND OF THE INVENTION

Such shelving assemblies provide a materials management system for tradespeople and other workers (e.g., carpenters, plumbers, painters, electricians, etc.) that fit within any number of vehicles.

SUMMARY OF THE INVENTION

The invention provides, in one aspect, a modular shelving assembly for use in a vehicle including a cargo space at least partially defined by a floor and a side wall of the vehicle. The shelving assembly includes at least two interconnected upright assemblies. Each of the upright assemblies includes a first panel, a second panel, and a coupler member separate from and unitizing the first and second panels. The modular shelving assembly further includes a rail secured to one of the floor and the side wall to which at least one of the interconnected upright assemblies is anchored.

The invention provides, in another aspect, a modular shelving assembly for use in a vehicle including a cargo space at least partially defined by a floor and a side wall of the vehicle. The shelving assembly includes a first panel, a second panel identical to the first panel, a cargo supporting member interconnecting the first and second panels, and a rail secured to at least one of the floor and the side wall to which at least one of the first and second panels is anchored. The first and second panels are slidable along the rail to reposition the panels within the cargo space of the vehicle.

Other aspects of the invention will become apparent by consideration of the detailed description and accompanying drawings.

BRIEF DESCRIPTION OF THE DRAWINGS

FIG. 6 is a cross-sectional view of the upright assembly of FIG. 4.

FIG. 6A is an enlarged view of a portion of the upright assembly shown in FIG. 6.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
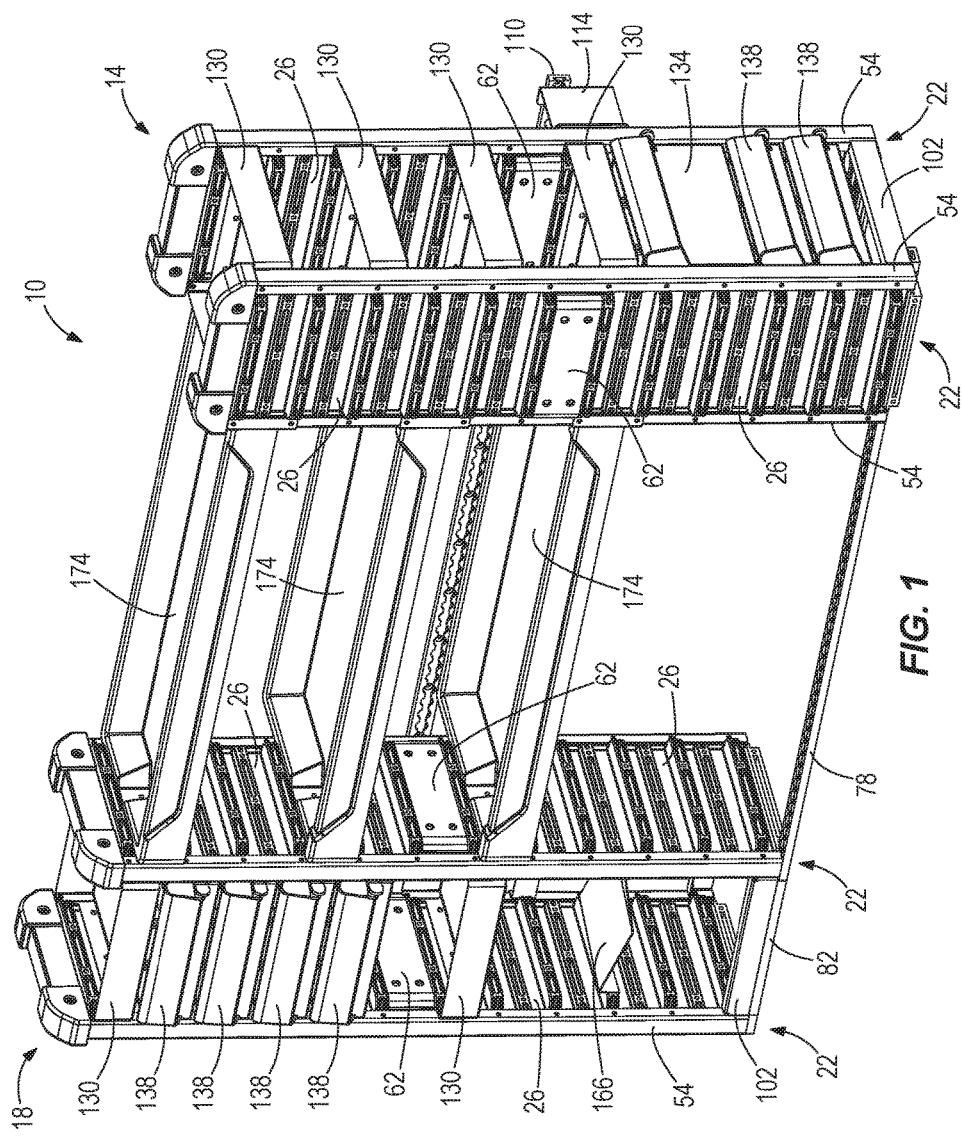
FIG. 1 is a front perspective view of a modular shelving assembly in accordance with an embodiment of the invention.
Figure 2:
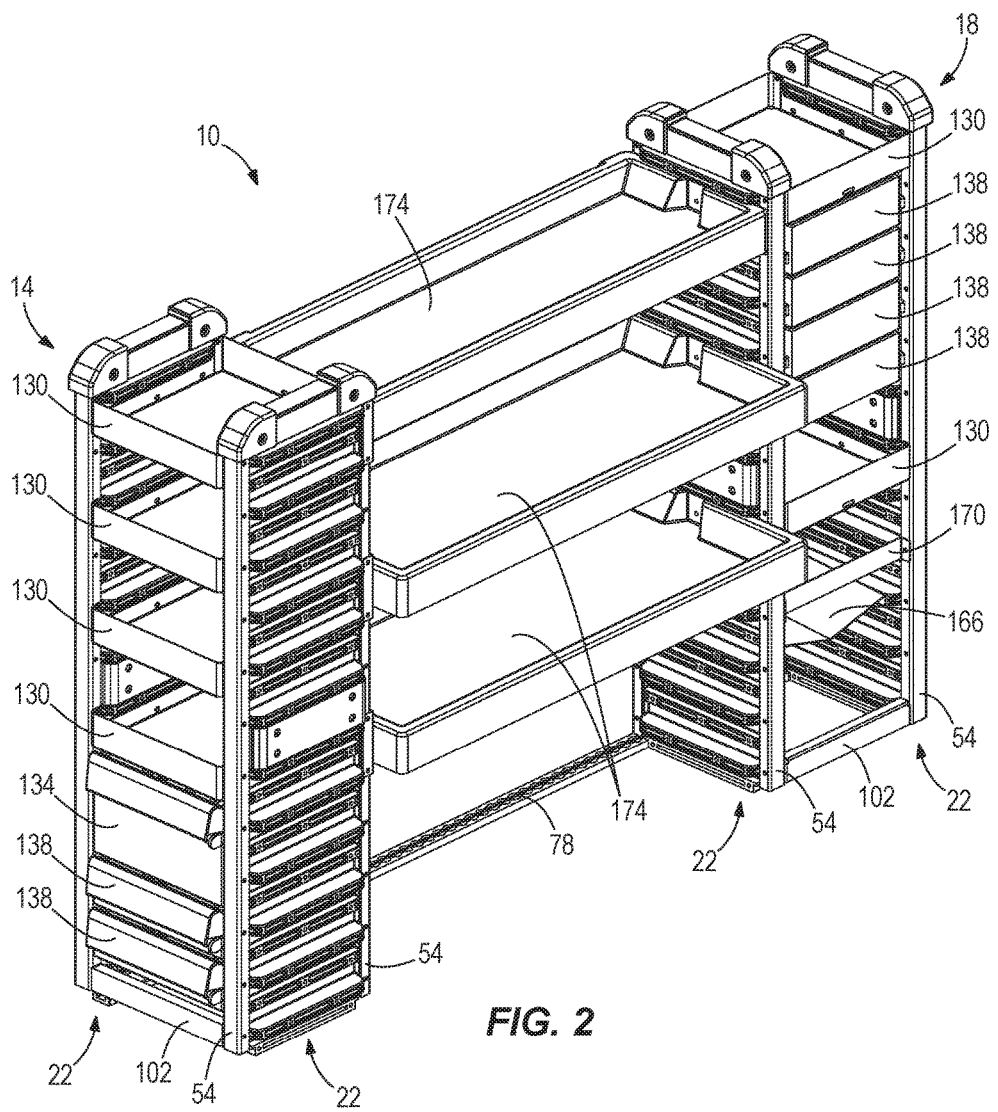
FIG. 2 is a rear perspective view of the modular shelving assembly of FIG. 1.
Figure 3:
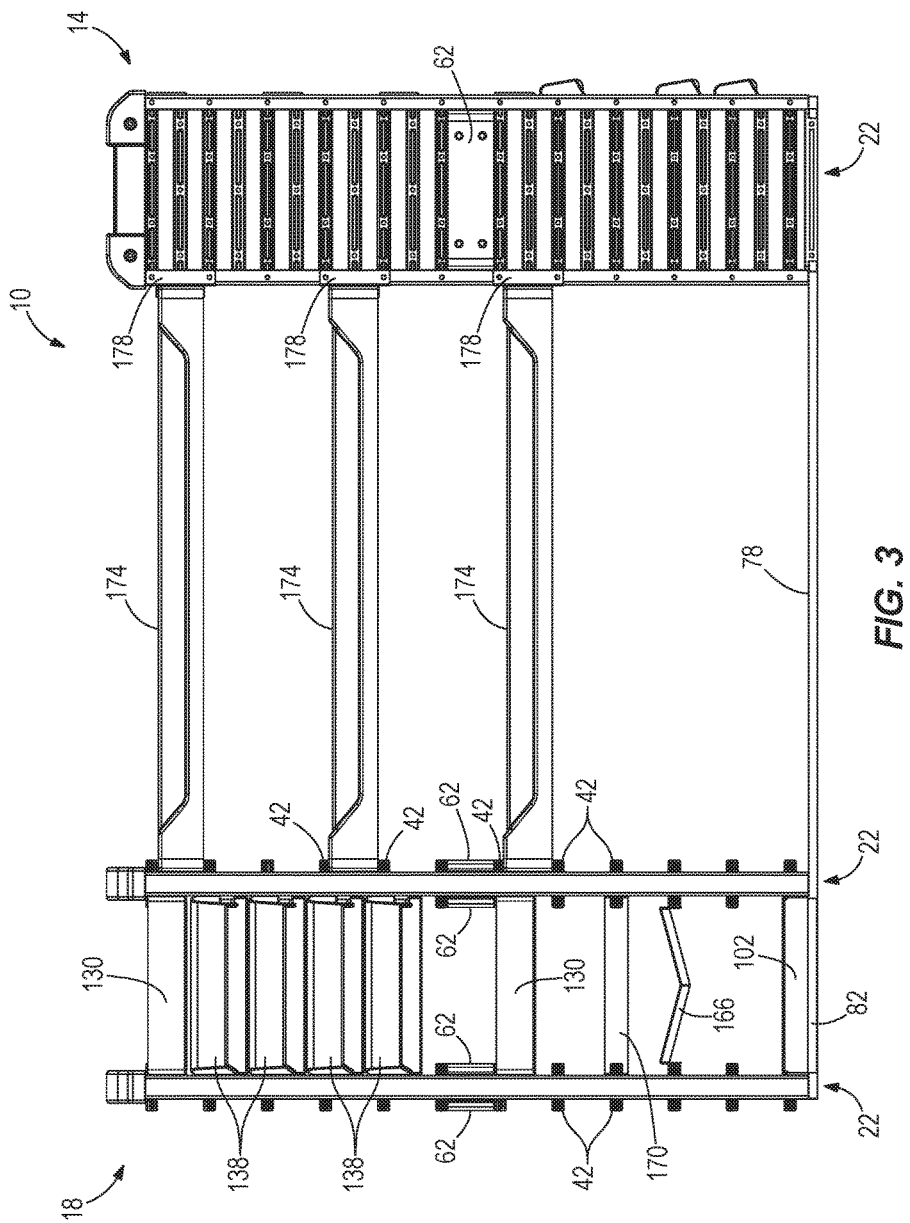
FIG. 3 is front view of the modular shelving assembly of FIG. 1.

FIGS. 1-3 illustrate a modular shelving assembly 10 including a first cabinet 14 and a second cabinet 18. Each of the cabinets 14, 18 includes two upright assemblies 22 and a plurality of material supporting members (which are discussed in further detail below) supported by the upright assemblies 22. The shelving assembly 10 is utilized in a vehicle (e.g., vehicle V in FIG. 36) including a cargo space at least partially defined by a floor and a side wall of the vehicle.

Figure 4:
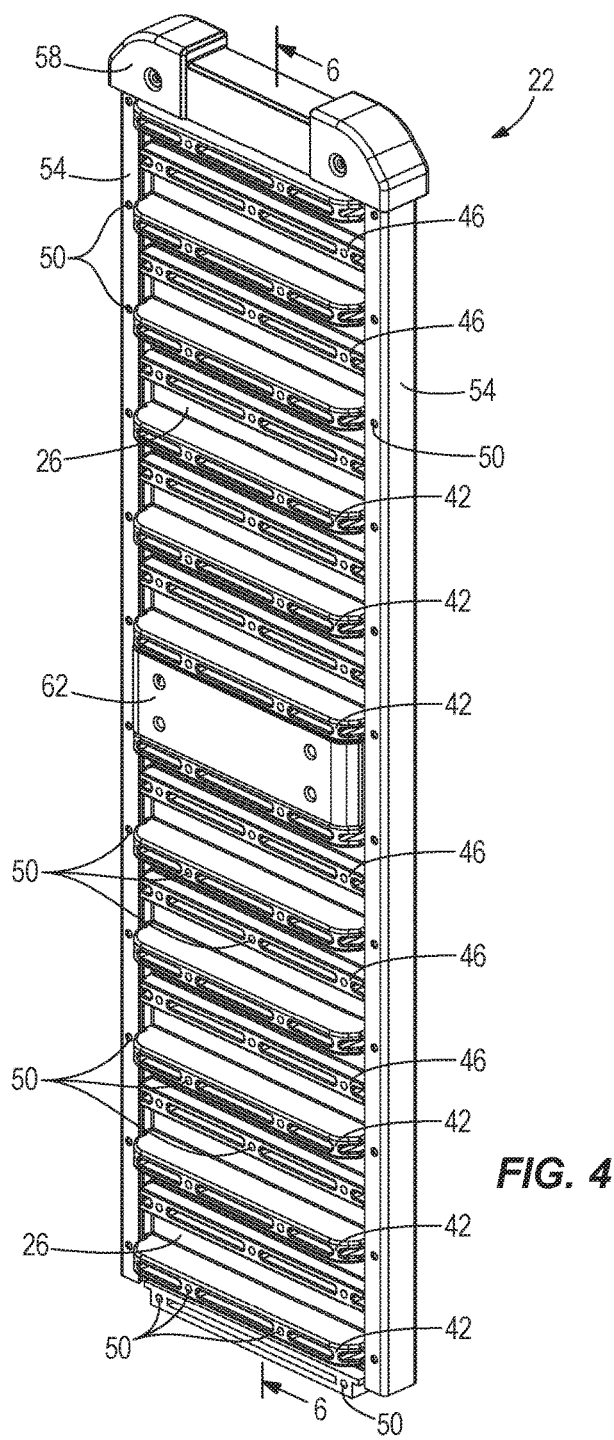
FIG. 4 is a perspective view of an upright assembly incorporated in the modular shelving assembly of FIG. 1.
Figure 5:
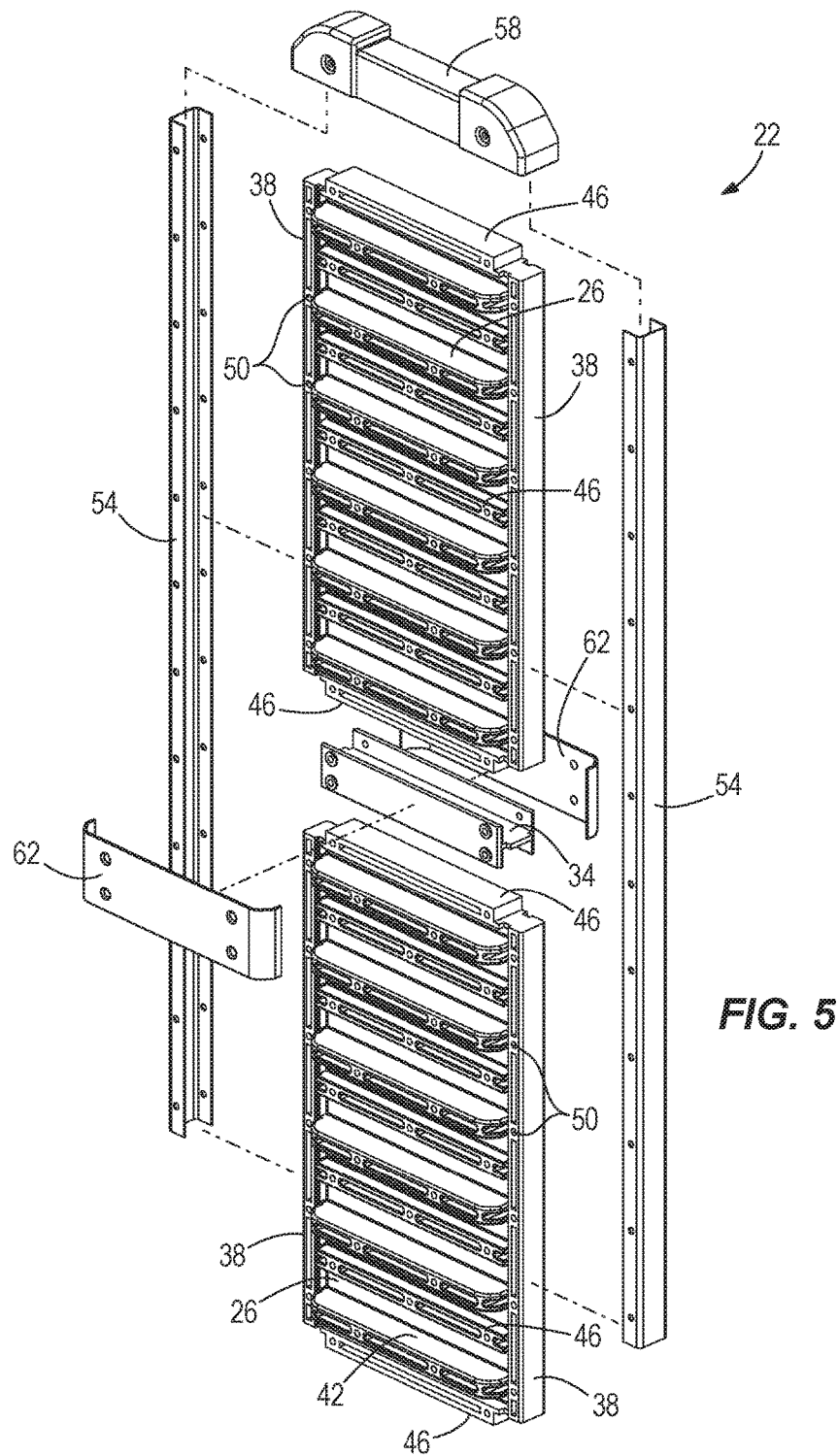
FIG. 5 is an exploded perspective view of the upright assembly of FIG. 4.

With reference to FIGS. 4 and 5, each of the upright assemblies 22 includes two identical panels 26 coupled together, or unitized, by an I-beam coupler 34 (FIG. 5). The panels 26 are constructed of a lightweight plastic material (e.g., a HDPE structural foam). Alternatively, the panels 26 may be made of any of a number of materials. With continued reference to FIG. 5, each of the panels 26 includes two edge rails 38, and a plurality of ledges 42 and ribs 46 extending between the two edge rails 38. Each of the panels 26 also includes a plurality of bores 50 configured to receive threaded fasteners positioned along the edge rails 38, the ledges 42, and the ribs 46. The bores 50 in the ledges 42 are blind and threaded for receiving threaded fasteners. Each of the upright assemblies 22 also includes structural vertical channels 54, each having a "C" shape, fastened to the edge rails 38 of the panels 26. Each of the upright assemblies 22 further includes a cap 58 to cover the top edge of the uppermost panel 26 and two coupler covers 62, with one on each side of the I-beam coupler 34.

With reference to FIGS. 6 and 6A, the I-beam coupler 34 is positioned between the two panels 26. The coupler covers 62 cover the I-beam coupler 34 and are positioned between a ledge 42 on the bottom panel 26 and a ledge 42 on the uppermost panel 26. Fasteners (not shown) are passed through apertures in the coupler cover 62 and I-beam coupler 34 corresponding to bores 50 on ribs 46 of the panels 26.

Figure 4A:
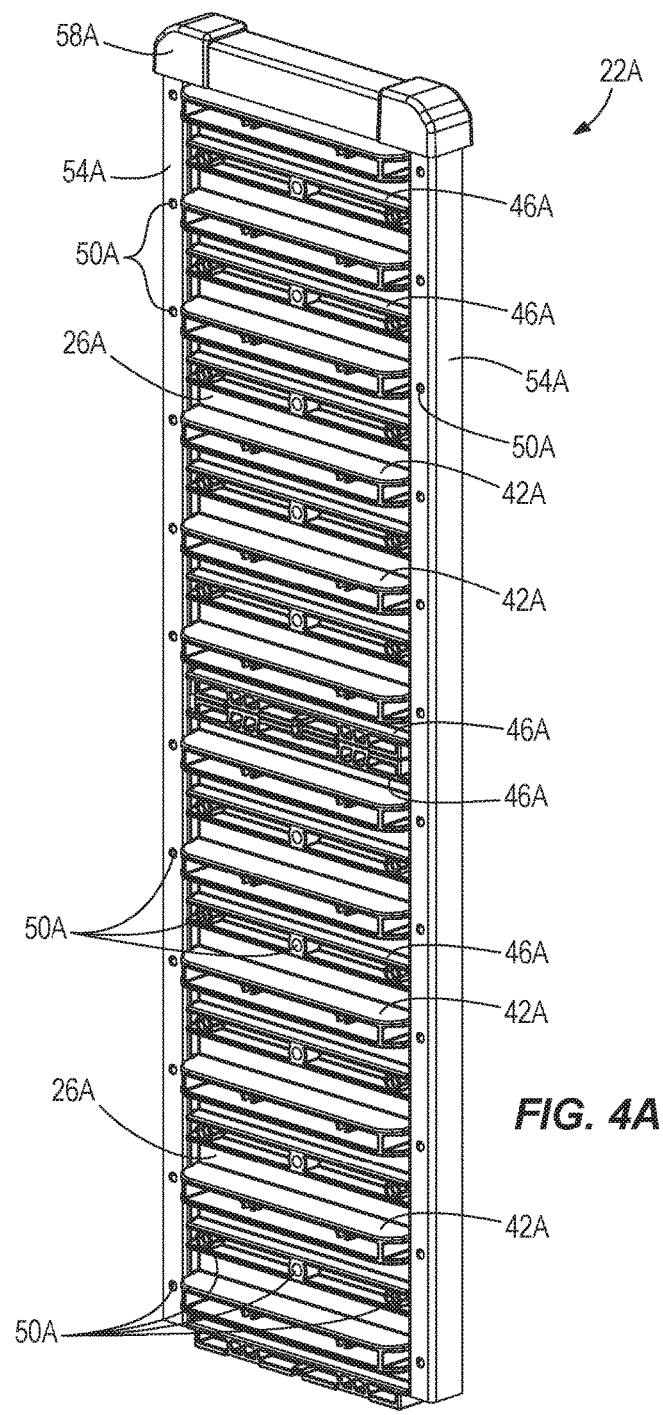
FIG. 4A is a perspective view of an upright assembly according to another aspect of the invention.
Figure 5A:
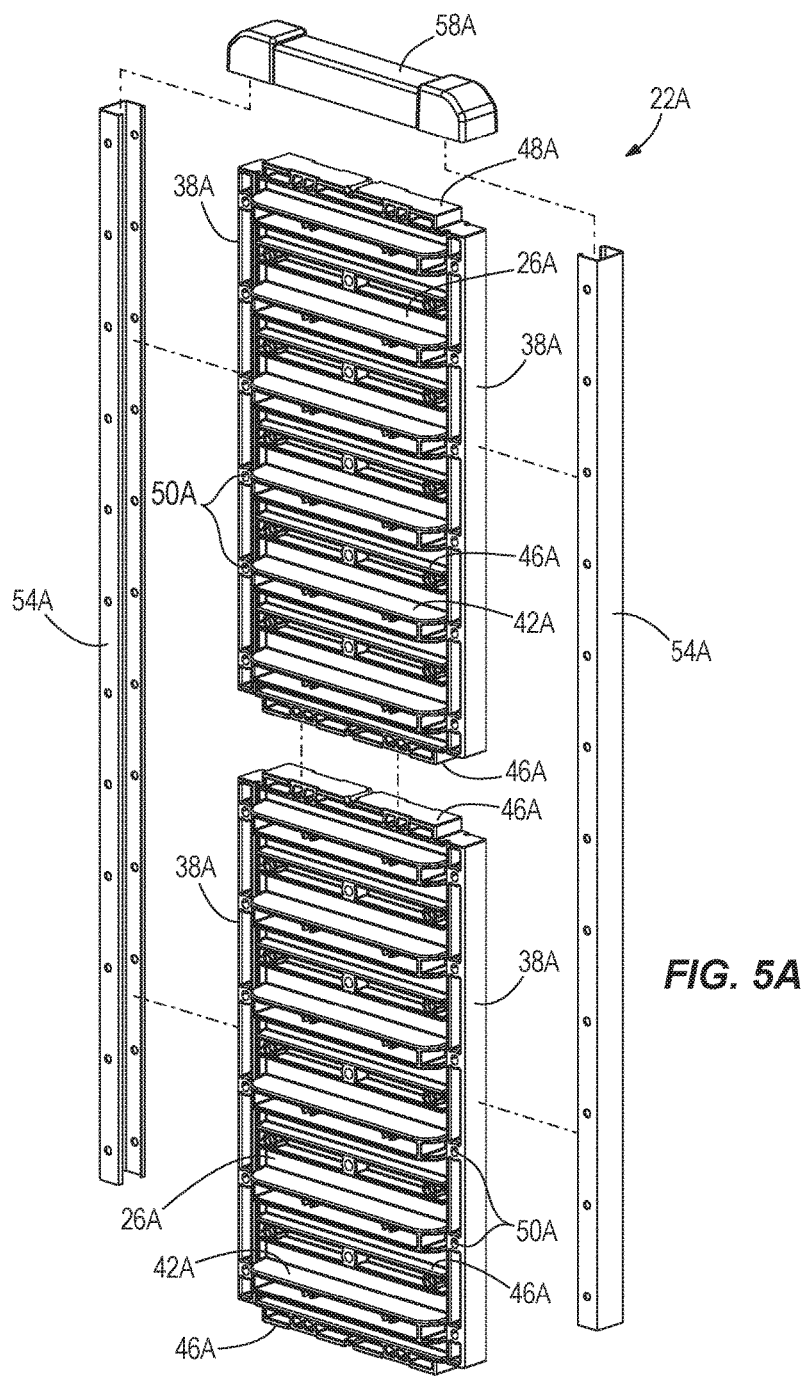
FIG. 5A is an exploded perspective view of the upright assembly of FIG. 4A.

With reference to FIGS. 4A and 5A, an upright assembly 22A according to another aspect of the invention is shown with two identical panels 26A coupled together or unitized by structural vertical channels 54A (i.e., coupler members), each having a "C" shape. The panels 26A are constructed of a lightweight plastic material (e.g., a HDPE structural foam). Alternatively, the panels 26A may be made of any of a number of materials. With continued reference to FIG. 5A, each of the panels 26A includes two edge rails 38A, and a plurality of ledges 42A and ribs 46A extending between the two edge rails 38A. Each of the panels 26A also includes a plurality of bores 50A configured to receive threaded fasteners positioned along the edge rails 38A and the ribs 46A. The structural vertical channels 54A are fastened to the edge rails 38A of the panels 26A using the bores 50A. Each of the upright assemblies 22A further includes a cap 58A to cover the top edge of the uppermost panel 26A. With further reference to FIG. 5A, the adjacent panels 26A are stacked in an end-to-end configuration with a rib 46A on the bottom panel 26A abutting a rib 46A on the uppermost panel 26A.

Figures 7A, 7B, 7C:
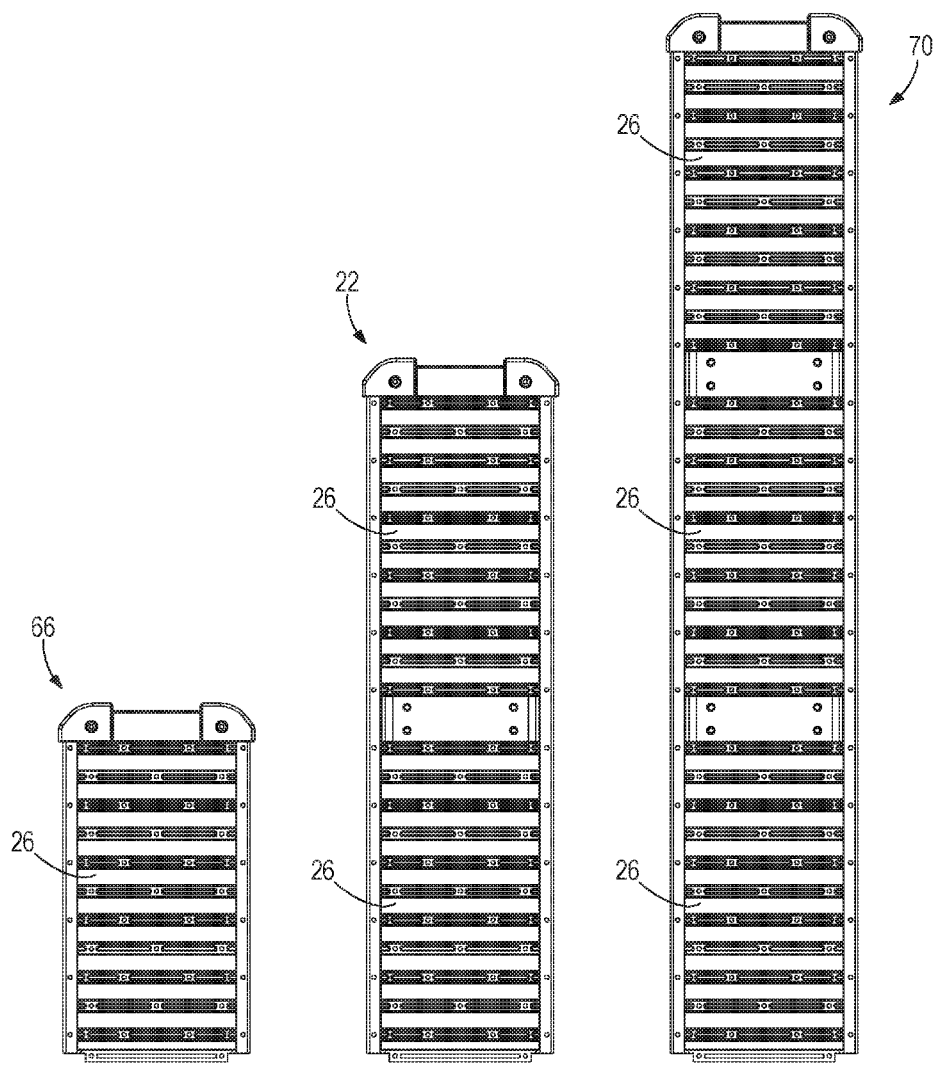
FIG. 7A is a front view of another upright assembly including one panel.
FIG. 7B is a front view of the upright assembly of FIG. 4 including two panels.
FIG. 7C is a front view of another upright assembly including three panels.

With reference to FIGS. 7A-7C, the shelving assembly 10 may include upright assemblies having any number of panels 26. For example, the shelving assembly 10 may include one or more upright assemblies 66 having a single panel 26 (FIG. 7A), or one or more upright assemblies 70 having three interconnected panels 26 (FIG. 7C). The upright assemblies can be configured with any number of panels 26 in accordance with the spatial limitations of a cargo vehicle and/or the intended use of the shelving assembly 10. Accordingly, any number of modular shelving assemblies can therefore be created by the user to best meet their needs by utilizing upright assemblies of various heights, while utilizing common components.

Figure 8:
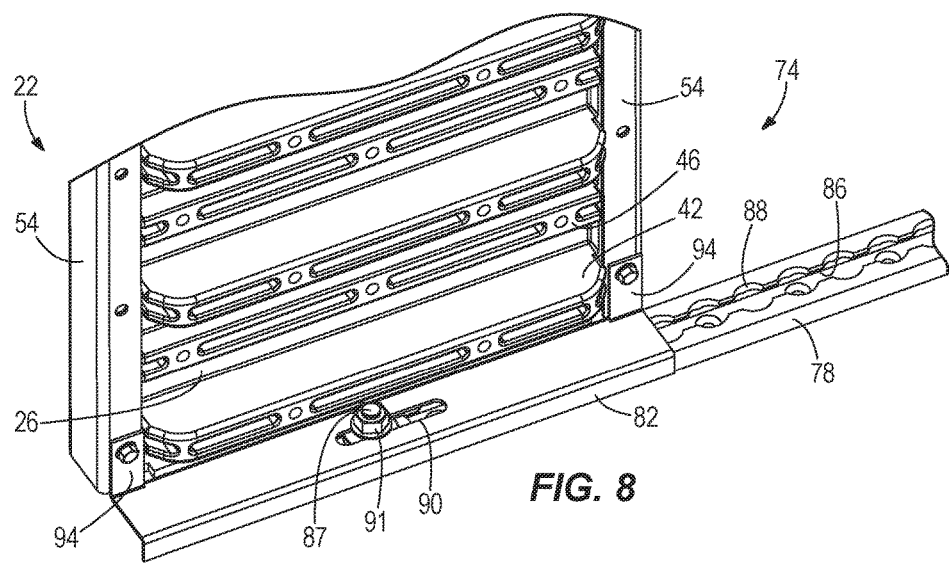
FIG. 8 is a perspective view of an anchor assembly incorporated in the modular shelving assembly of FIG. 1.
Figure 9A:
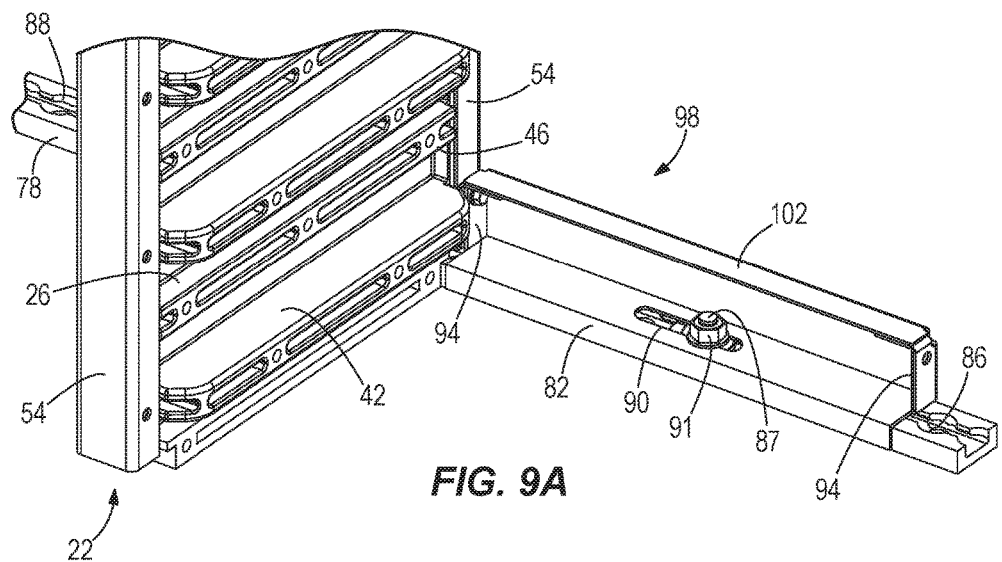
FIG. 9A is a perspective view of another anchor assembly incorporated in the modular shelving assembly of FIG. 1.
Figure 9B:
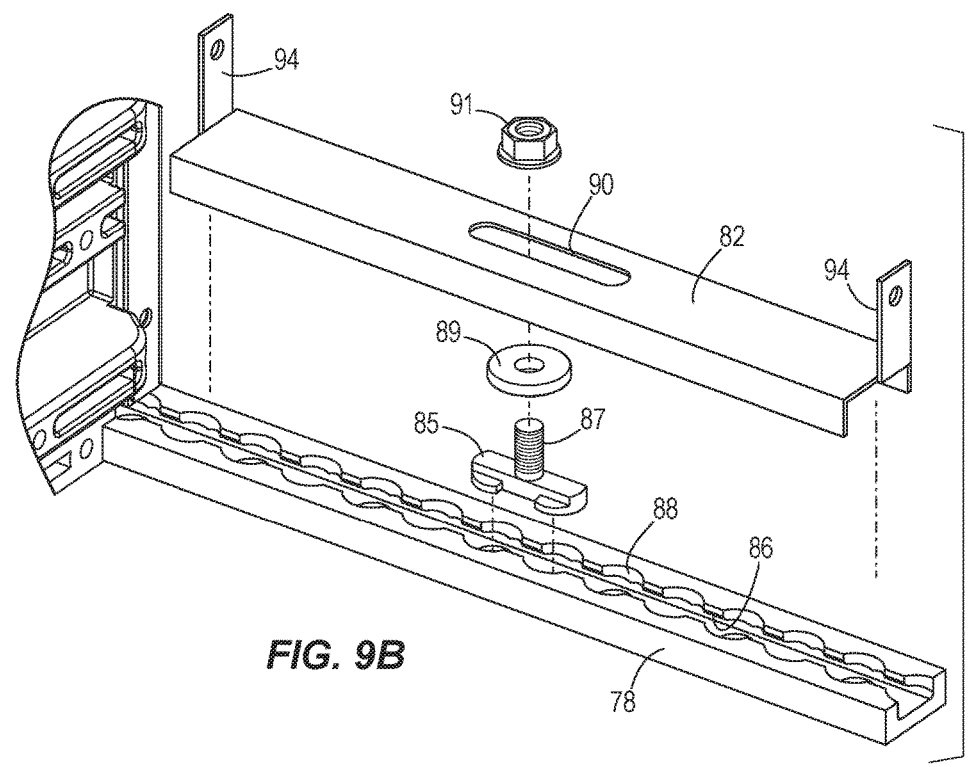
FIG. 9B is an exploded perspective view of the anchor assembly of FIG. 9A.

With reference to FIGS. 8, 9A, and 9B, the modular shelving assembly 10 includes different anchor assemblies 74, 98 for fastening the upright assembly 22 to an interior floor of a cargo vehicle. The anchor assembly 74 includes a floor mounting rail 78 and a floor mounting bracket 82. The floor mounting rail 78 is independently secured to the floor of the cargo vehicle within the vehicle's cargo space by any of a number of different fasteners, and includes a channel 86 configured to slidably receive a head 85 of a fastener 87 (FIG. 9B) within the channel 86. The floor mounting rail 78 includes spaced scallops 88 through which corresponding lobes of the fastener head 85 are inserted, and once within the channel 86, the fastener 87 can be moved to any position along the rail 78. In the illustrated embodiment of either of the anchor assemblies 74, 98, the fastener 87 includes a threaded shank protruding from the channel 86. A spacer 89 may be positioned between the rail 78 and the floor mounting bracket 82.

With continued reference to FIG. 9B, the floor mounting bracket 82 includes a slot 90 through which the fastener 87 extends, and a nut 91 is threaded to the fastener 87 for clamping the floor mounting bracket 82 to the rail 78, thereby securing the floor mounting bracket 82 in a particular location along the length of the rail 78. In turn, the floor mounting bracket 82 is fastened to the upright assemblies 22 of the cabinet 18 (via flanges 94), thereby securing the cabinet 18 to the floor of the cargo vehicle. The floor mounting bracket 82 (and therefore the connected upright assemblies 22) are adjustable relative to the rail 78 by an amount corresponding to the length of the slot 90 to provide a "fine" adjustment capability within the cargo space of the vehicle without detaching either of the upright assemblies 22 of the cabinet 18 from the rail 78. If additional or "coarse" adjustment of the upright assemblies 22 (and therefore the cabinet 18) is required, the nuts 91 need only to be loosened a sufficient amount to release the clamping force holding the fastener 87 and bracket 82 together. Once the fastener 87 is no longer clamped with the rail 78, the floor mounting bracket 82 may slide along the floor mounting rail 78 (and the fastener 87 may slide through the channel 86) to reposition the cabinet 18 within the cargo space of the vehicle without detaching either of the upright assemblies 22 of the cabinet 18 from the rail 78.

FIG. 8 illustrates the anchor assembly 74 being used for mounting the upright assembly 22 in an orientation that is parallel with the floor mounting rail 78, while FIG. 9A illustrates the anchor assembly 98 being used for mounting the upright assembly 22 in an orientation that is perpendicular to the floor mounting rail 78. Consequently, the cabinets 14, 18 may be secured to the floor mounting rail 78 (and the wall mounting rail 110 described below) in one of four orientations coinciding with the front, the rear, and the left and right sides of the cargo space of the vehicle depending upon the particular usage of the cabinet 14, 18 and the desired manner of accessing the shelves and/or drawers of the cabinets. With continued reference to FIG. 9A, the anchor assembly 98 further includes a cross member 102 that extends along the floor mounting bracket 82 to interconnect the two upright assemblies 22 of the cabinet 18. The cross member 102 provides structural reinforcement to the upright assemblies 22 for maintaining the spacing between the upright assemblies 22 along their height. Although not shown, additional cross members 102 may be utilized to connect the upper portions of the upright assemblies 22 of the cabinet 18.

Figure 8A:
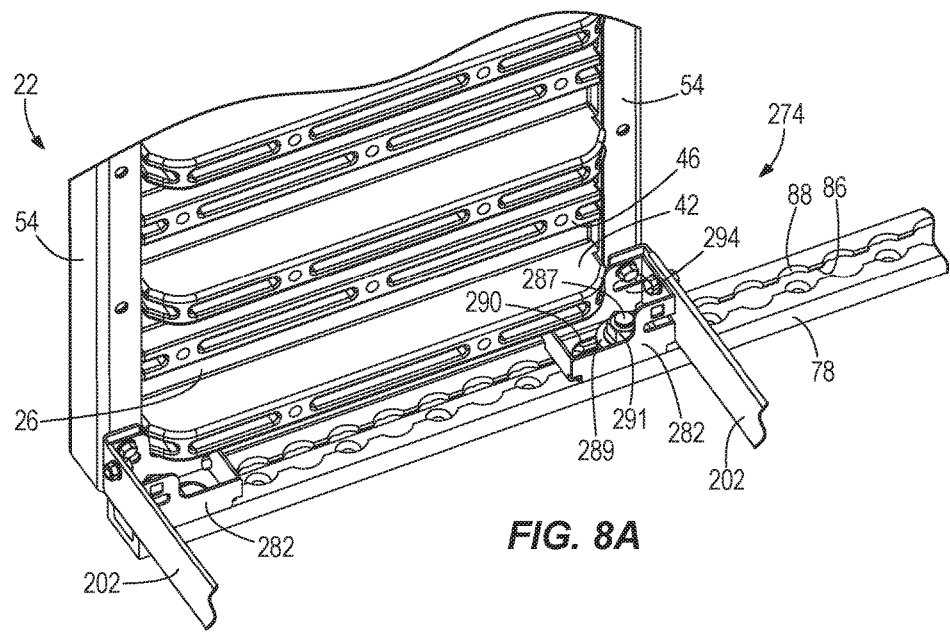
FIG. 8A is a perspective view of an alternative anchor assembly to that shown in FIG. 8 for use in the modular shelving assembly of FIG. 1.
Figure 9C:
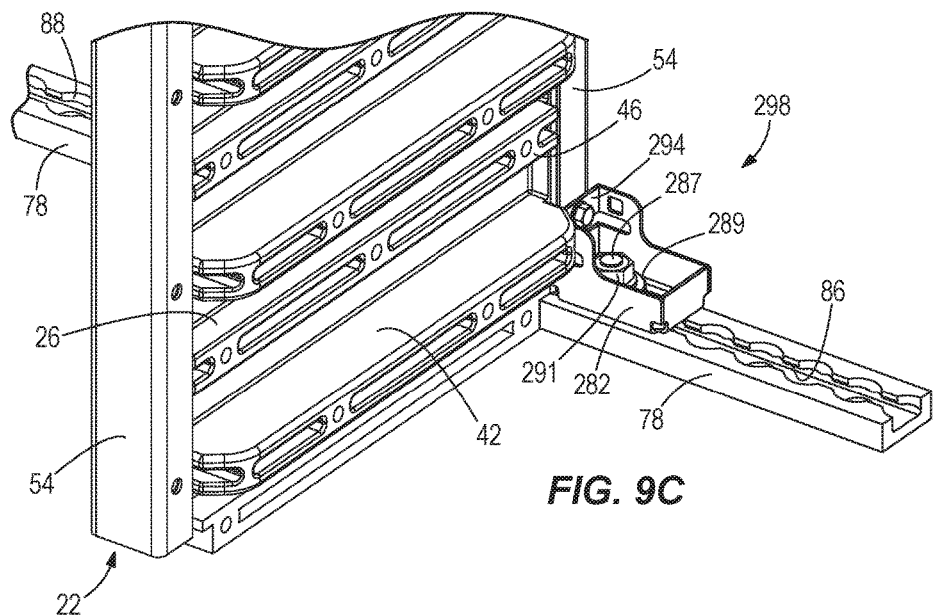
FIG. 9C is a perspective view of an alternative anchor assembly to that shown in FIG. 9A for use in the modular shelving assembly of FIG. 1.
Figure 9D:
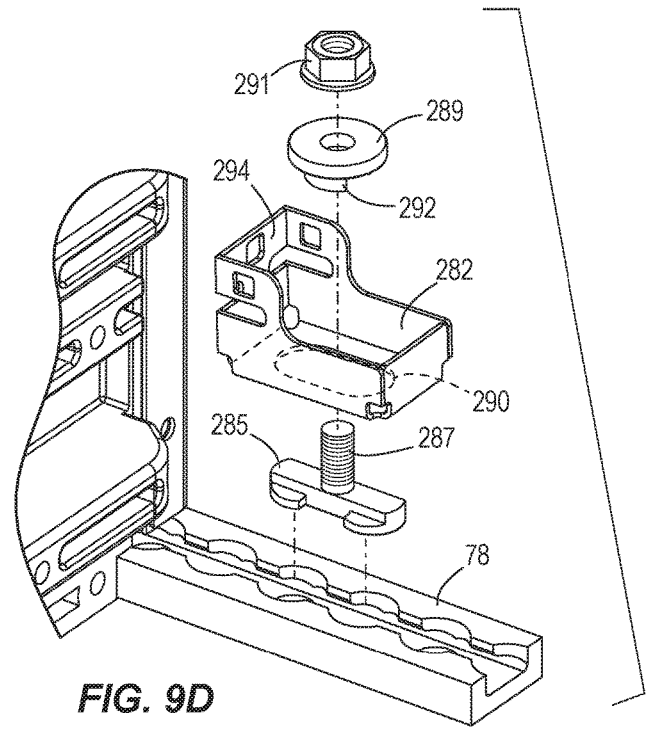
FIG. 9D is an exploded perspective view of the anchor assembly of FIG. 9C.

With reference to FIGS. 8A, 9C, and 9D, the modular shelving assembly 10 may include alternative anchor assemblies 274, 298 for fastening upright assemblies to an interior floor of a cargo vehicle. With reference to FIG. 8A, the anchor assembly 274 includes the floor mounting rail 78 and two brackets 282 secured to each upright assembly 22. As previously described, the floor mounting rail 78 is independently secured to the floor of the cargo vehicle within the vehicle's cargo space by any of a number of different fasteners, and includes a channel 86 configured to slidably receive a head 285 of a fastener 287 (FIG. 9D) within the channel 86. The floor mounting rail 78 includes spaced scallops 88 (FIG. 8A) through which corresponding lobes of the fastener head 285 are inserted, and once within the channel 86, the fastener 287 can be moved to any position along the rail 78. In the illustrated embodiment of either of the anchor assemblies 274, 298, the fastener 287 includes a threaded shank protruding from the channel 86. A spacer 289 having lobes 292 (FIG. 9D) may be positioned between the bracket 282 and a nut 291. More specifically, the spacer 289 is mounted coaxially with the fastener 287 with the lobes 292 extending into one of the scallops 88 to prevent the fastener 287 from further sliding along the channel 86. In this position of the fastener 287 within the rail 78, the lobes on the head 285 prevent the fastener 287 from being pulled out of the channel 86, and the spacer 289 interlocks the fastener 287 into alignment with one of the scallops 88.

With continued reference to FIG. 9D, each of the brackets 282 includes a slot 290 through which the fastener 287 extends, and the nut 291 is threaded to the fastener 287 for clamping the bracket 282 to the rail 78, thereby securing the bracket 282 in a particular location along the length of the rail 78. The lobes 292 are located radially inward of the outer periphery of the spacer 289 and are extendable through the slot 290 in an associated bracket 282 and into the scallops 88, while the annular portion of the spacer between the outer periphery and the lobes is engageable with the floor of the bracket 282 for clamping the bracket 282 against the rail 78. The bracket 282 is fastened to the upright assemblies 22 via flanges 294, thereby securing the upright assemblies 22 to the floor of the cargo vehicle. The bracket 282 (and therefore the connected upright assemblies 22) are adjustable relative to the rail 78 by an amount corresponding to the length of the slot 290 to provide a "fine" adjustment capability within the cargo space of the vehicle without detaching either of the upright assemblies 22 from the rail 78. If additional or "coarse" adjustment of the upright assemblies 22 is required, with each of the anchor assemblies 274, 298, the nuts 291 need only to be loosened a sufficient amount to permit the spacers 289 to be pulled upward and away from the rail 78, thereby removing the lobes 292 from the associated scallops 88 in the rail 78. Once the spacers 289 are no longer interlocked with the rail 78, the brackets 282 may slide along the floor mounting rail 78 (and the fastener 287 may slide through the channel 86) to reposition the upright assemblies 22 within the cargo space of the vehicle without detaching either of the upright assemblies 22 from the rail 78.

FIG. 8A illustrates the anchor assembly 274 being used for mounting the upright assembly 22 in an orientation that is parallel with the floor mounting rail 78, while FIG. 9C illustrates the anchor assembly 298 being used for mounting the upright assembly 22 in an orientation that is perpendicular to the floor mounting rail 78. Consequently, the cabinets 14, 18 may be secured to the floor mounting rail 78 (and the wall mounting rail 110 described below) in one of four orientations coinciding with the front, the rear, and the left and right sides of the cargo space of the vehicle depending upon the particular usage of the cabinet 14, 18 and the desired manner of accessing the shelves and/or drawers of the cabinets. With continued reference to FIG. 8A, the anchor assembly 274 further includes a cross member 202 that extends between respective floor mounting brackets 82 (only one of which is shown in FIG. 8A) mounted to spaced, parallel upright assemblies 22 for interconnecting the two upright assemblies 22 of the cabinet 18. The cross member 202 may be fastened to both the upright assembly 22 (i.e., through the flange 294 of the universal bracket 282) and to the universal bracket 282 itself. The cross member 202 provides structural reinforcement to the other of the upright assemblies 22 in the cabinet 18 that is not directly attached to the floor mounting rail 78. The use of two brackets 282 and a cross members 202 interconnecting the brackets 282 may be considered a single contiguous bracket interconnecting adjacent upright assemblies 22.

Figure 10:
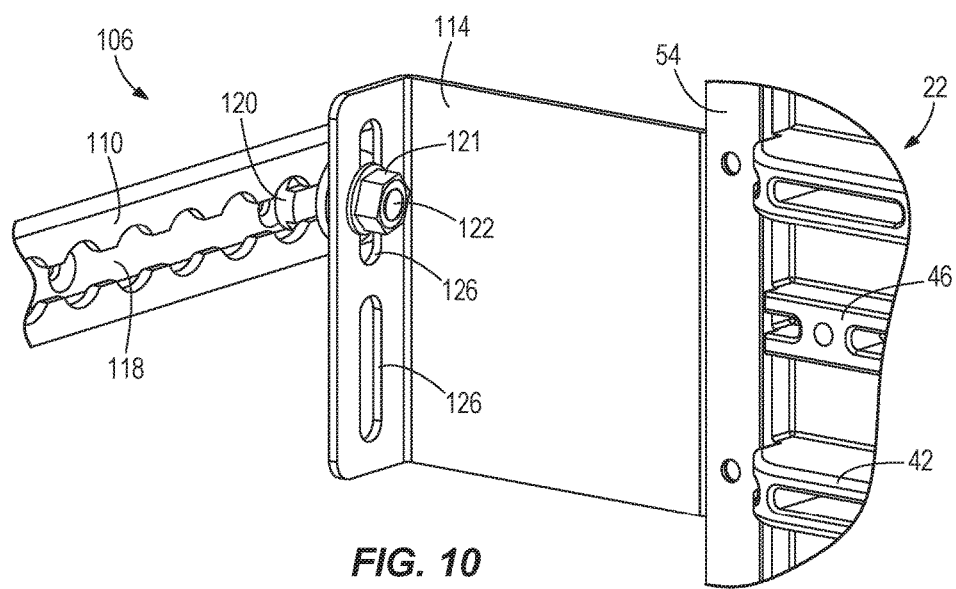
FIG. 10 is a perspective view of yet another anchor assembly incorporated in the modular shelving assembly of FIG. 1.

FIG. 10 illustrates another anchor assembly 106 for fastening an upright assembly 22 to an interior wall of the cargo vehicle within the vehicle's cargo space. The anchor assembly 106 includes a wall mounting rail 110, identical to the floor mounting rail 78, and a wall mounting bracket 114.

The wall mounting rail 110 is independently secured to the interior wall of the cargo vehicle by any of a number of different fasteners, and includes a channel 118 configured to slidably receive a head 120 of a threaded fastener 122. The fastener 122 is identical to fastener 87 shown in FIG. 9B, and protrudes through a slot 126 in the wall mounting bracket 114. A nut 121 is threaded to the fastener 122 to clamp the wall mounting bracket 114 to the wall mounting rail 110. A spacer similar to that shown in FIG. 9B or that shown in FIG. 9D may be positioned between the bracket 114 and the rail 110. Thus, the upright assemblies 22 (and therefore the cabinet 18) are slidable along the wall mounting rail 110 in the same manner as any of the anchor assemblies 74, 98, 274, 298 described above with the floor mounting rail 78 to reposition the cabinet 18 within the cargo space of the vehicle without detaching either of the upright assemblies 22 from the rail 110.

Figure 11:
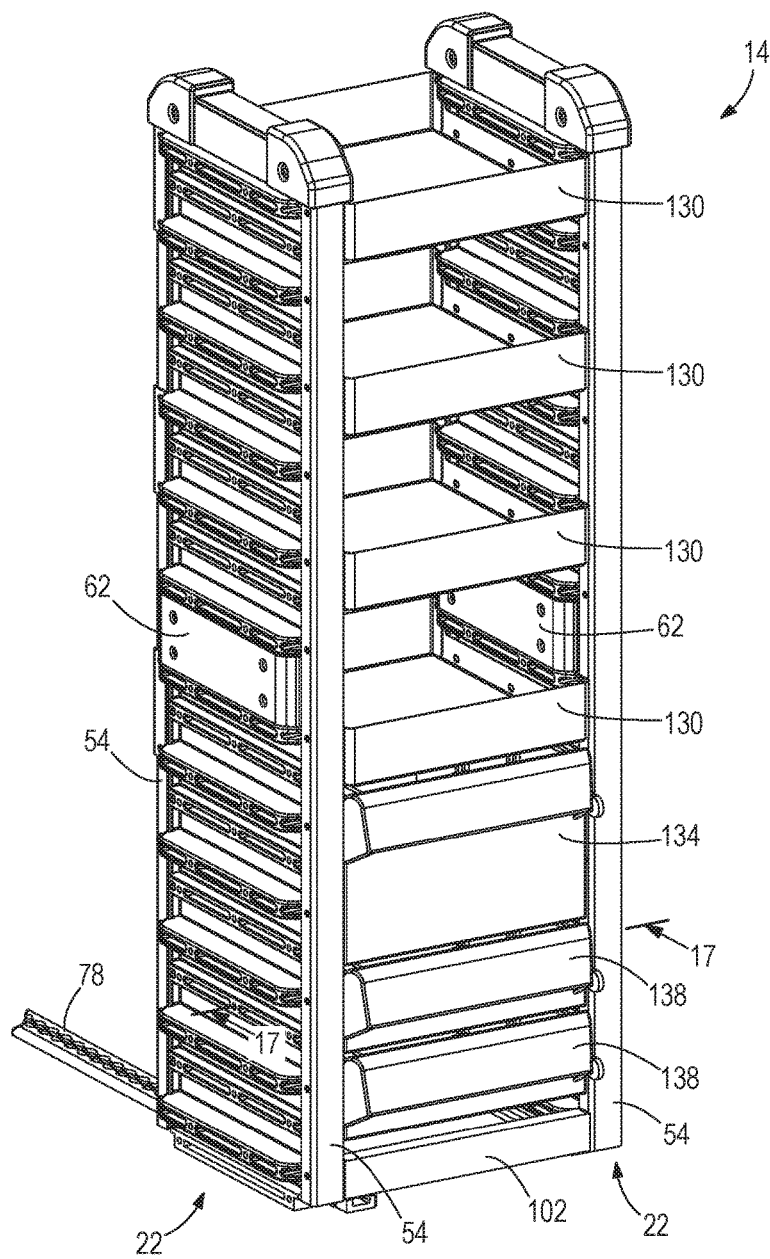
FIG. 11 is a perspective view of a cabinet incorporated in the modular shelving assembly of FIG. 1, including two upright assemblies of FIG. 4.

FIG. 11 illustrates the first cabinet 14 of the modular shelving assembly 10. The cabinet 14 includes two upright assemblies 22, with one of the upright assemblies 22 fastened to the floor mounting rail 78. The two upright assemblies 22 are interconnected with the cross members 102, only one of which is shown in FIG. 11. In addition, the first cabinet includes a plurality of fixed shelves 130 (FIGS. 11 and 12) and a plurality of large and small drawers 134, 138 (FIGS. 13-17) supported between the upright assemblies 22.

Figure 12:
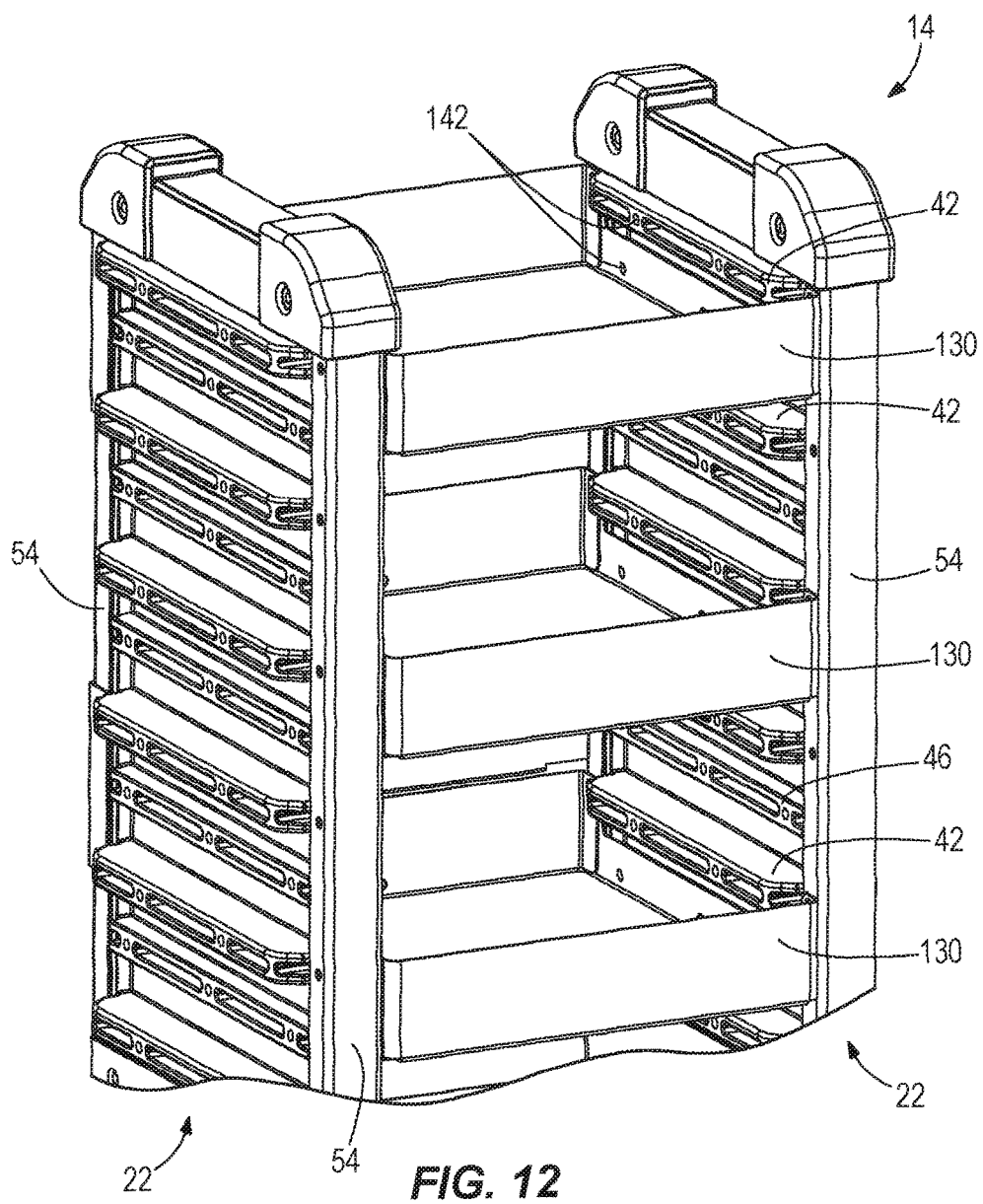
FIG. 12 is an enlarged perspective view of a portion of the cabinet of FIG. 11, including a plurality of fixed shelves.
Figure 13:
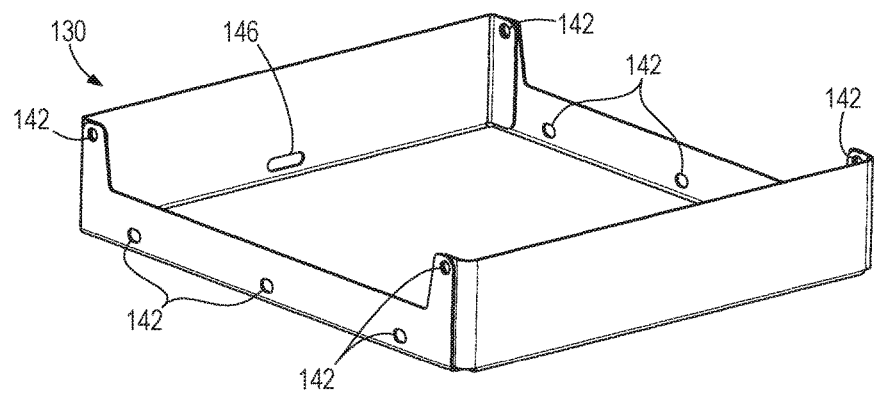
FIG. 13 is a perspective view of one of the fixed shelves of FIG. 12.
Figure 14:
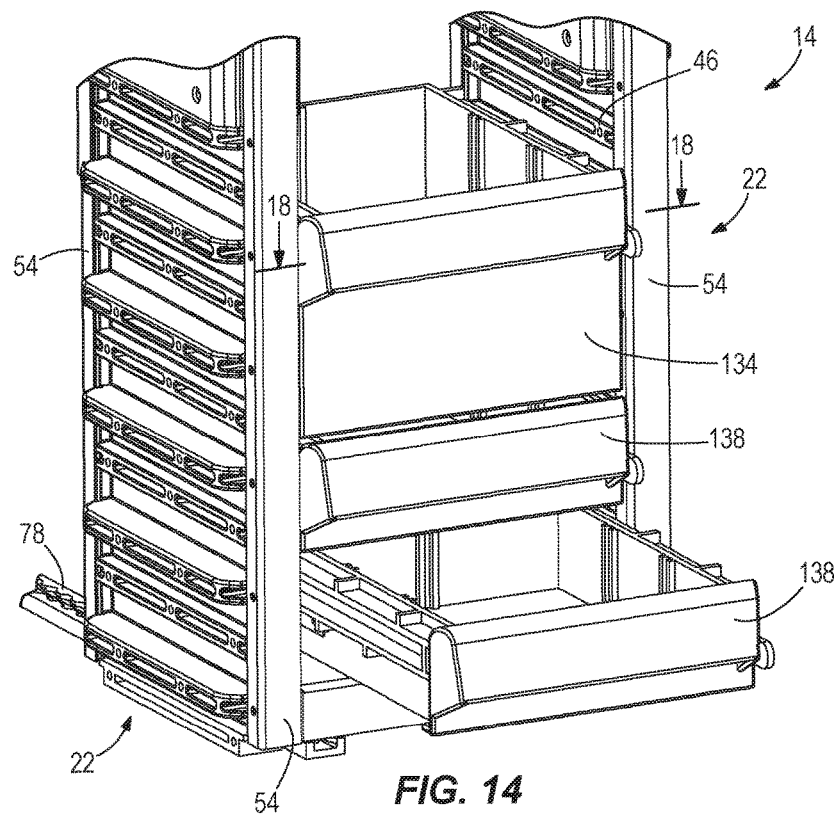
FIG. 14 is an enlarged perspective view of a portion of the cabinet of FIG. 11, including a plurality of drawers.
Figure 15:
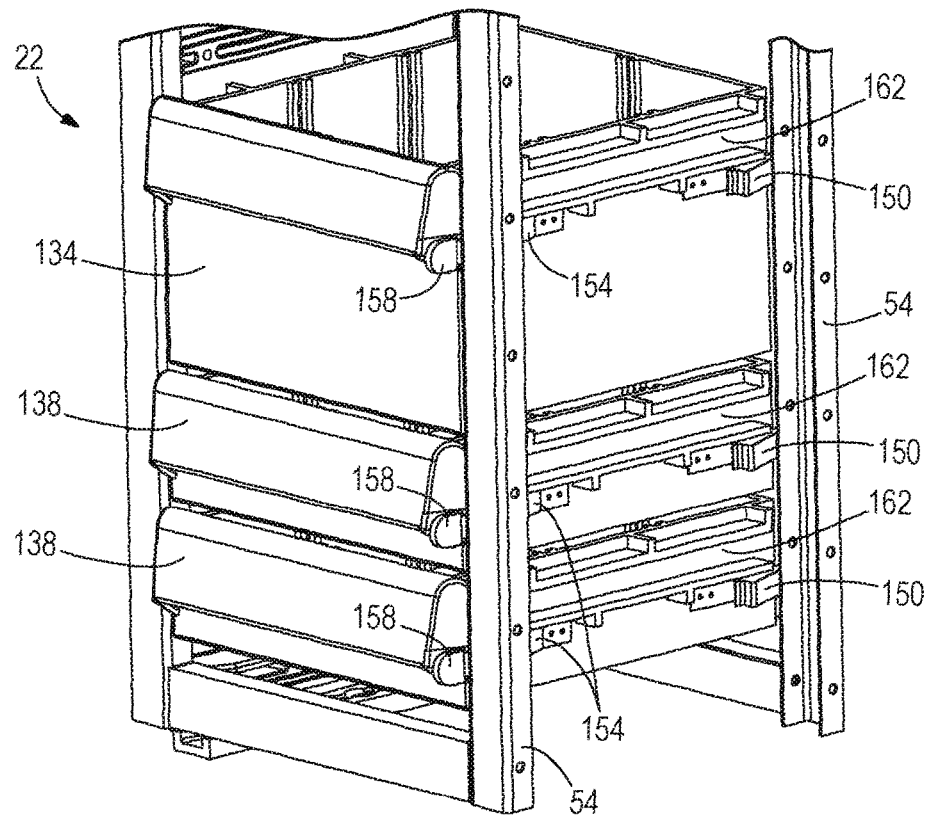
FIG. 15 is an enlarged perspective view of a portion of the cabinet of FIG. 11, with part of an upright assembly removed to illustrate the plurality of drawers.

With reference to FIGS. 12 and 13, the fixed shelves 130 extend between and are secured to two upright assemblies 22 though mounting apertures 142 in the shelves 130. The shelves 130 are fixed to the upright assemblies 22 between the ledges 42, with fasteners passing through mounting apertures 142 and received by the bores 50 in the ribs 46 and the rails 38 of opposed upright assemblies 22. In addition, the fixed shelves 130 include a mounting slot 146 to aid in securing other additional elements to the modular shelving assembly 10. Although not required, one of the fixed shelves 130 may be positioned near the top of the cabinet 14 to provide structural support and to tie together the two upright assemblies 22.

Figure 16A:
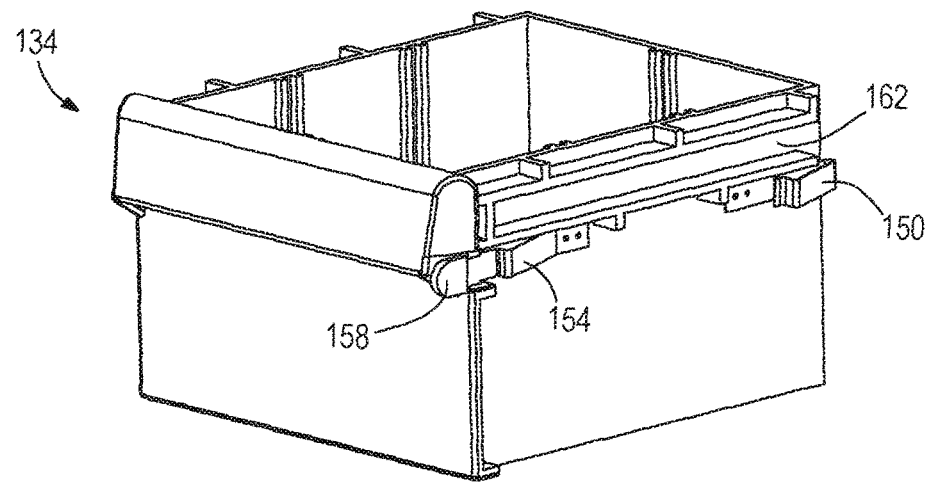
FIG. 16A is a perspective view of one of the drawers of FIG. 14.
Figure 16B:
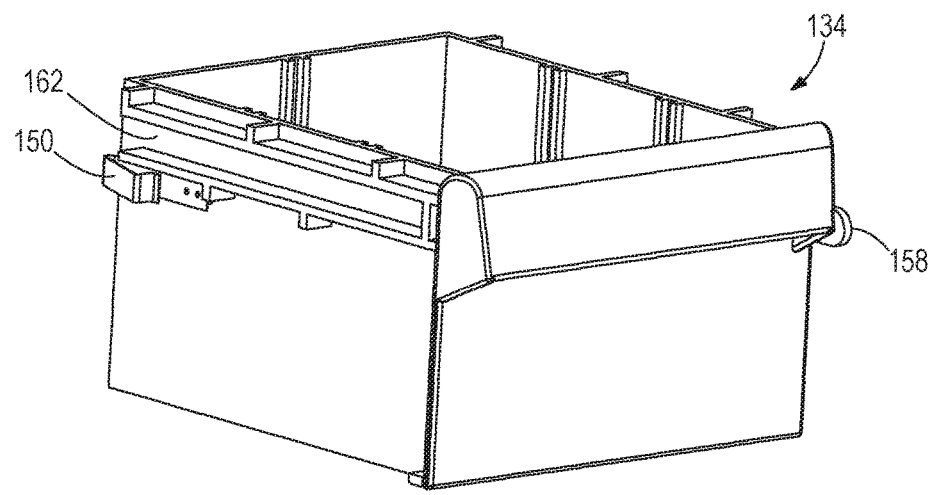
FIG. 16B is another perspective view of one of the drawers of FIG. 14.
Figure 17:
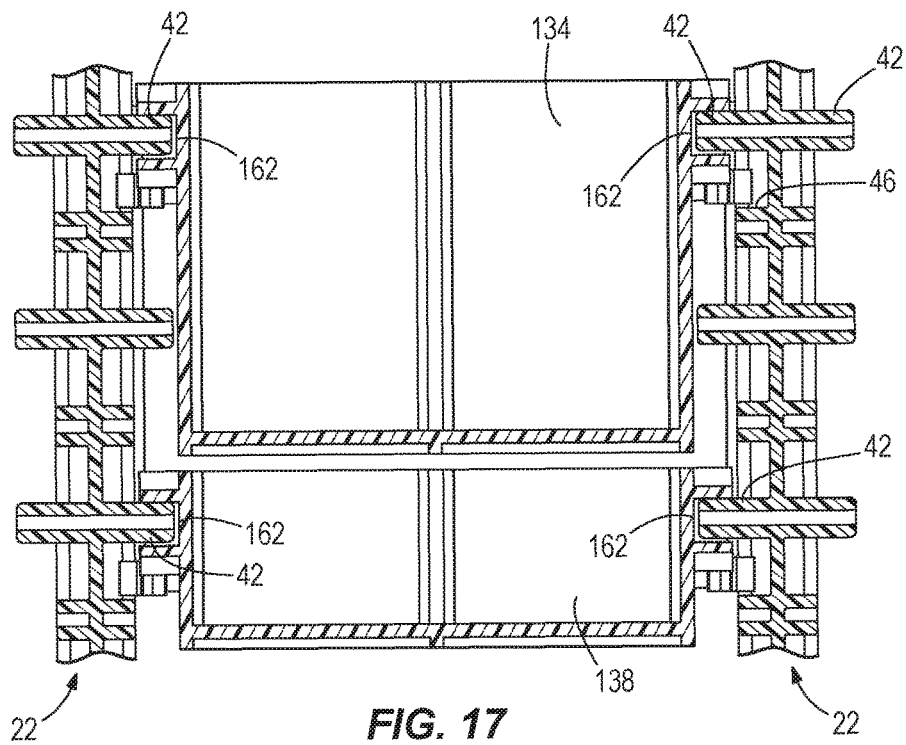
FIG. 17 is a cross-sectional view of a portion of the cabinet of FIG. 11.
Figure 18:
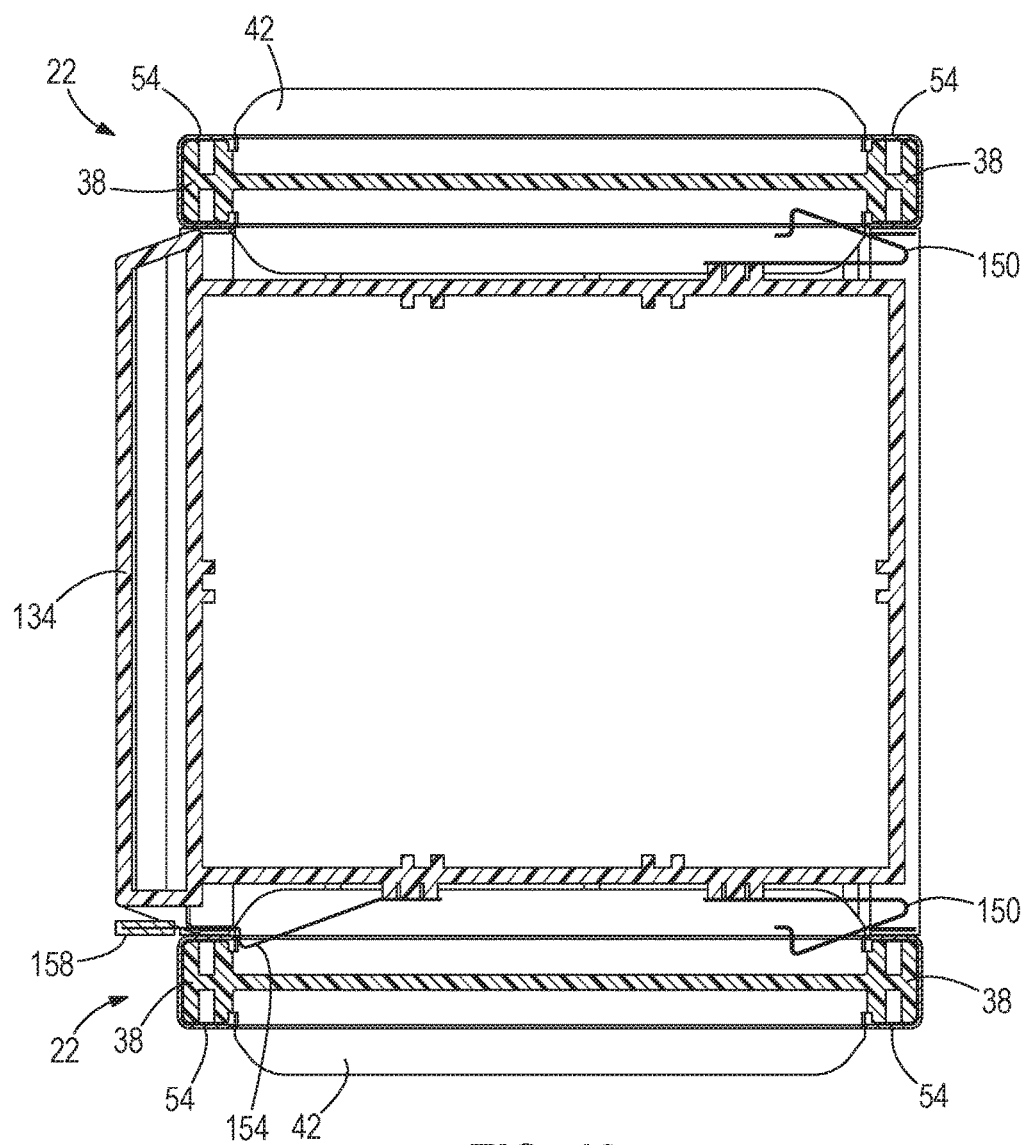
FIG. 18 is cross-sectional view of the cabinet assembly of FIG. 11, illustrating a plurality of latching springs incorporated on a drawer.

With reference to FIGS. 14-18, each of the drawers 134, 138 includes two rear springs 150 (FIGS. 16A and 16B) and a front spring 154 (FIG. 16A). Illustrated in FIG. 15, with the panels 26 of one of the upright assemblies 22 being removed for clarity, the spring 154 engages one of the vertical channels 54 to releasably lock the drawers 134, 138 in a shut or closed position (see also FIG. 18). The front spring 154 includes a tab 158 to be actuated by the user to disengage the front spring 154 from the channel 54 to release the drawers 134, 138, allowing them to slide forwardly relative to the two upright assemblies 22. FIG. 18 illustrates a cross-sectional view of the drawer 134 in the shut position between the two upright assemblies 22. The front spring 154 prevents the drawer 134 from opening by engaging one of the vertical channels 54 of the upright assembly 22. To open the drawer 134, a user depresses the tab 158 toward the drawer 134, thereby deflecting the spring 154 away from the vertical channel 54 a sufficient amount to clear the channel 54. The user then needs only to pull the drawer 134 to open it. The rear springs 150 limit the extent to which the drawers 134, 138 may be opened by contacting the vertical channels 54. The drawers 134, 138 further include a channel 162 on each side to slidably receive the ledges 42 of the upright assemblies 22 to thereby support the drawers 134, 138 on the upright assemblies 22 (FIGS. 16A-17). The drawers 134, 138 may slide along the ledges 42 to an extended position until the back springs 150 engage the vertical channel 54, thereby preventing the extent to which the drawers 134, 138 may be opened.

Figure 19:
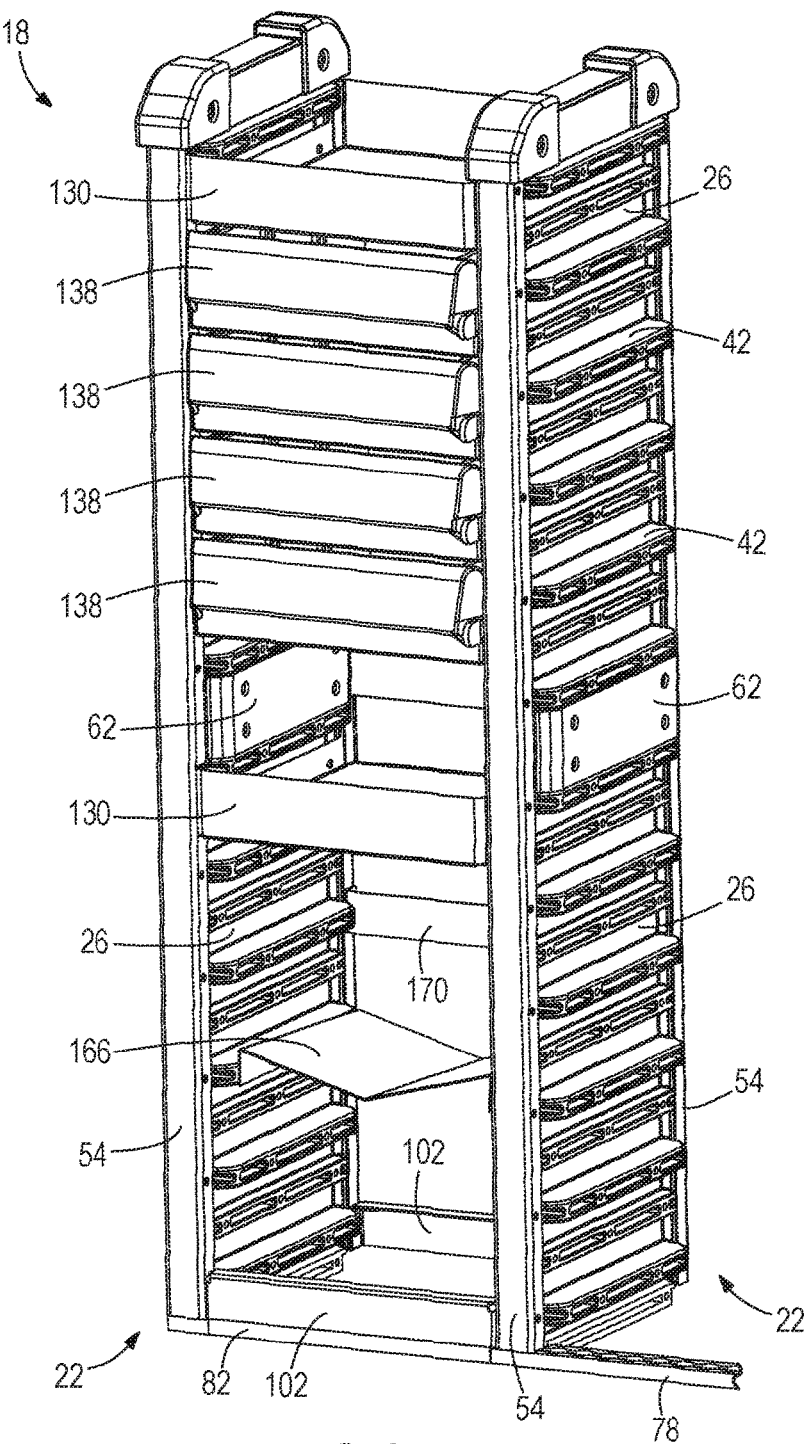
FIG. 19 is a perspective view of another cabinet incorporated in the modular shelving assembly of FIG. 1, including two upright assemblies of FIG. 4.
Figure 20:
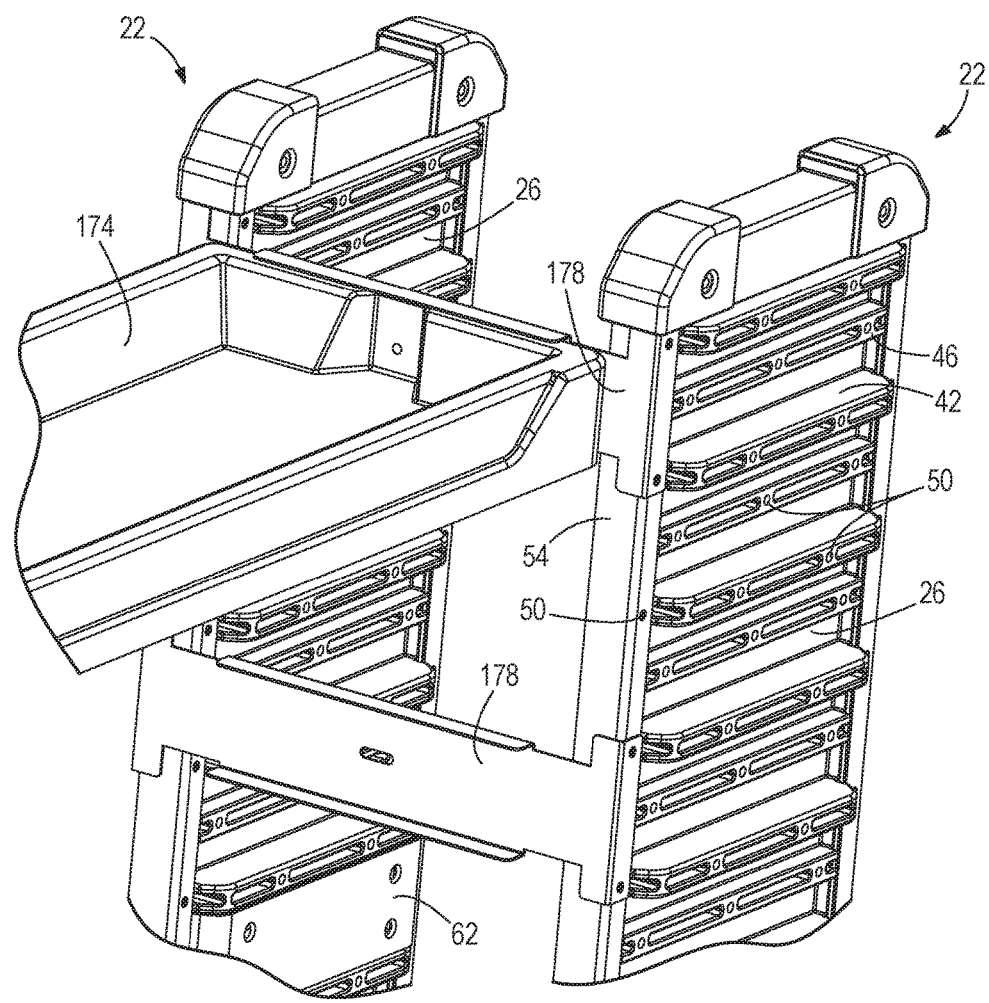
FIG. 20 is an enlarged perspective view of a portion of the cabinet of FIG. 11 fastened to a shelf.
Figure 25:
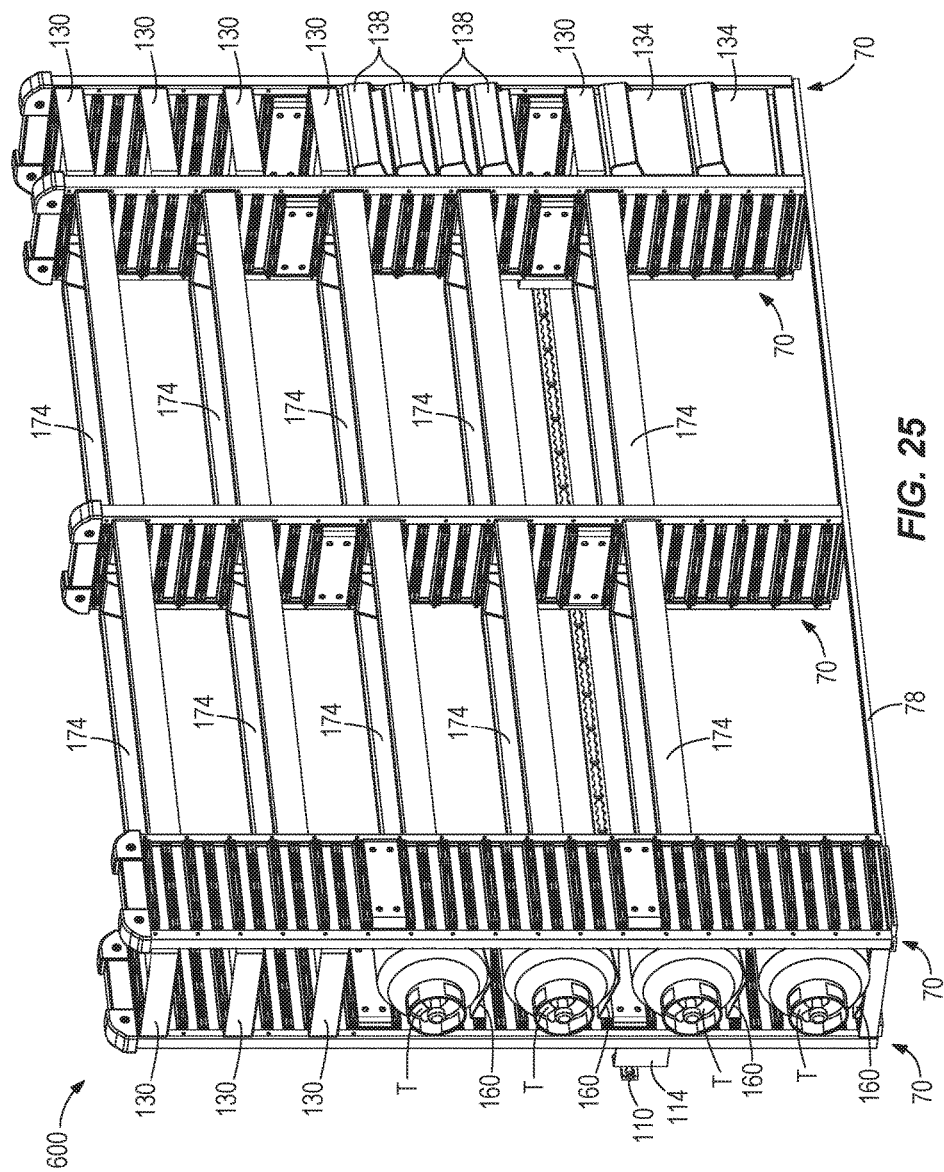
FIG. 25 is a front perspective view of a modular shelving assembly in accordance with yet another embodiment of the invention.

FIG. 19 illustrates the second cabinet 18 of the modular shelving assembly 10 fastened to the floor mounting rail 78. The second cabinet 18 includes fixed shelves 130, small drawers 138, and a bottle rack 166 extending between and fastened to the two upright assemblies 22. The bottle rack 166 is configured to hold, for example, a Freon tank T (FIG. 25). A bottle rack back plate 170 extends between and is fastened to the two upright assemblies 22 to provide a back stop for the bottle or tank.

With reference to FIGS. 1-3 and 20, the first cabinet 14 and the second cabinet 18 are interconnected by shelves 174. The shelves 174 vary in depth (e.g., 12 inches deep, 16 inches deep, etc.) to accommodate curvature in the interior side wall of the cargo vehicle. The shelves 174 may be positioned between two ledges 42 of respective opposed upright assemblies 22 and fastened to one or more of the bores 50 within the ribs 46. Alternatively, the shelves 174 may be fastened to a shelf bracket 178 spanning across two upright assemblies 22 (FIG. 20) when the upright assemblies 22 are oriented generally parallel with the shelves 174.

Figure 21:
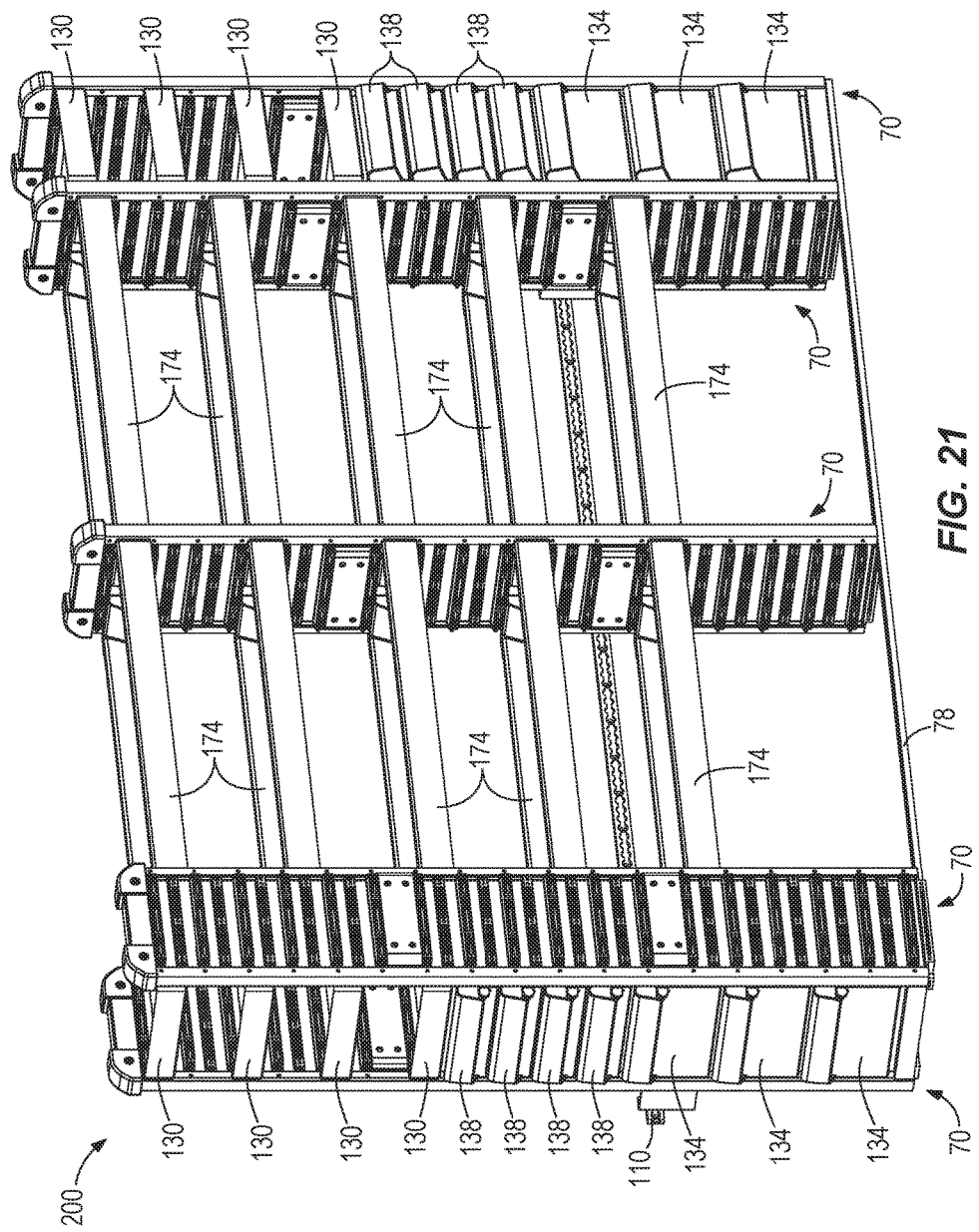
FIG. 21 is a front perspective view of a modular shelving assembly in accordance with another embodiment of the invention, including a plurality of upright assemblies of FIG. 7C.
Figure 22:
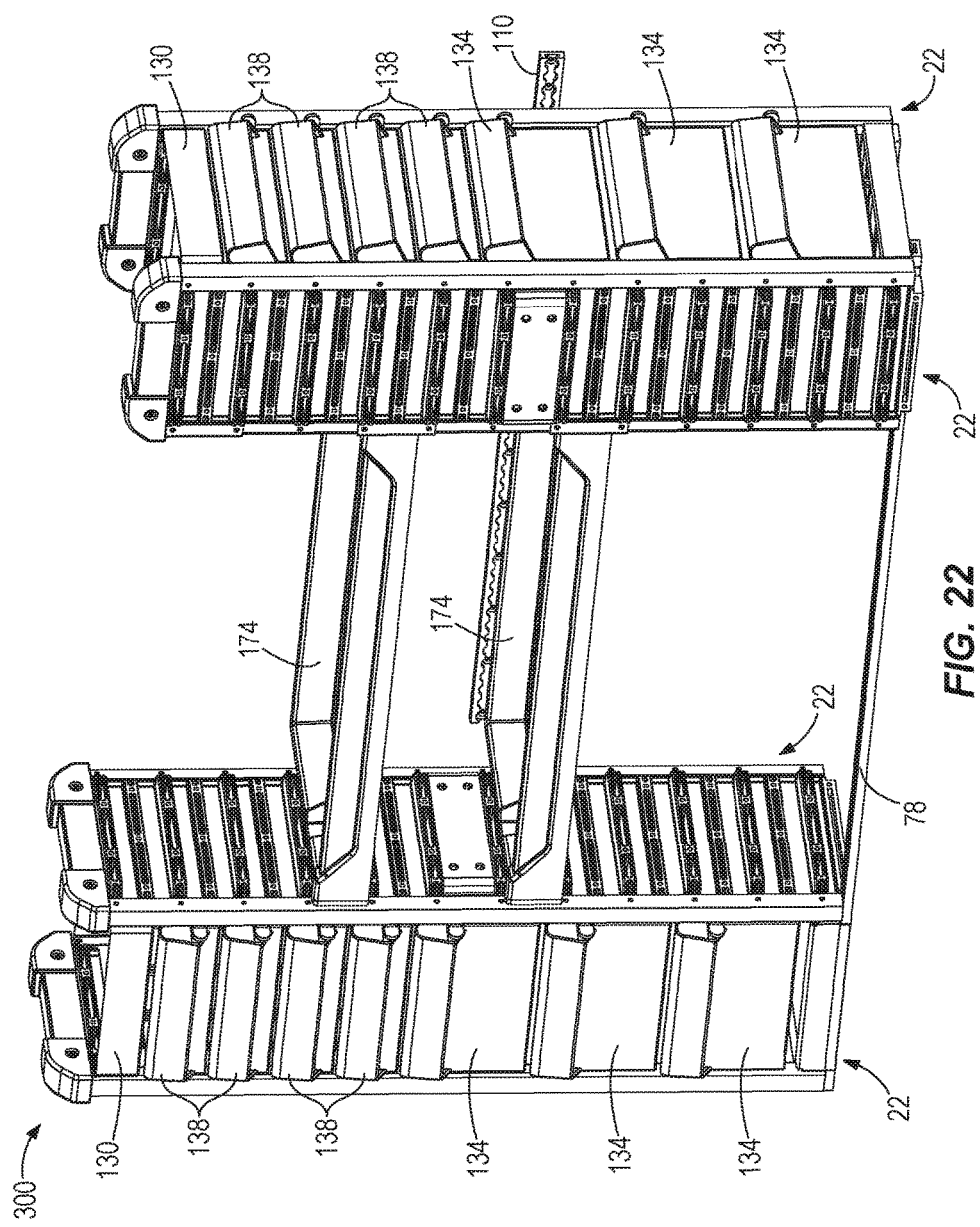
FIG. 22 is a front perspective view of a modular shelving assembly in accordance with yet another embodiment of the invention.
Figure 23:
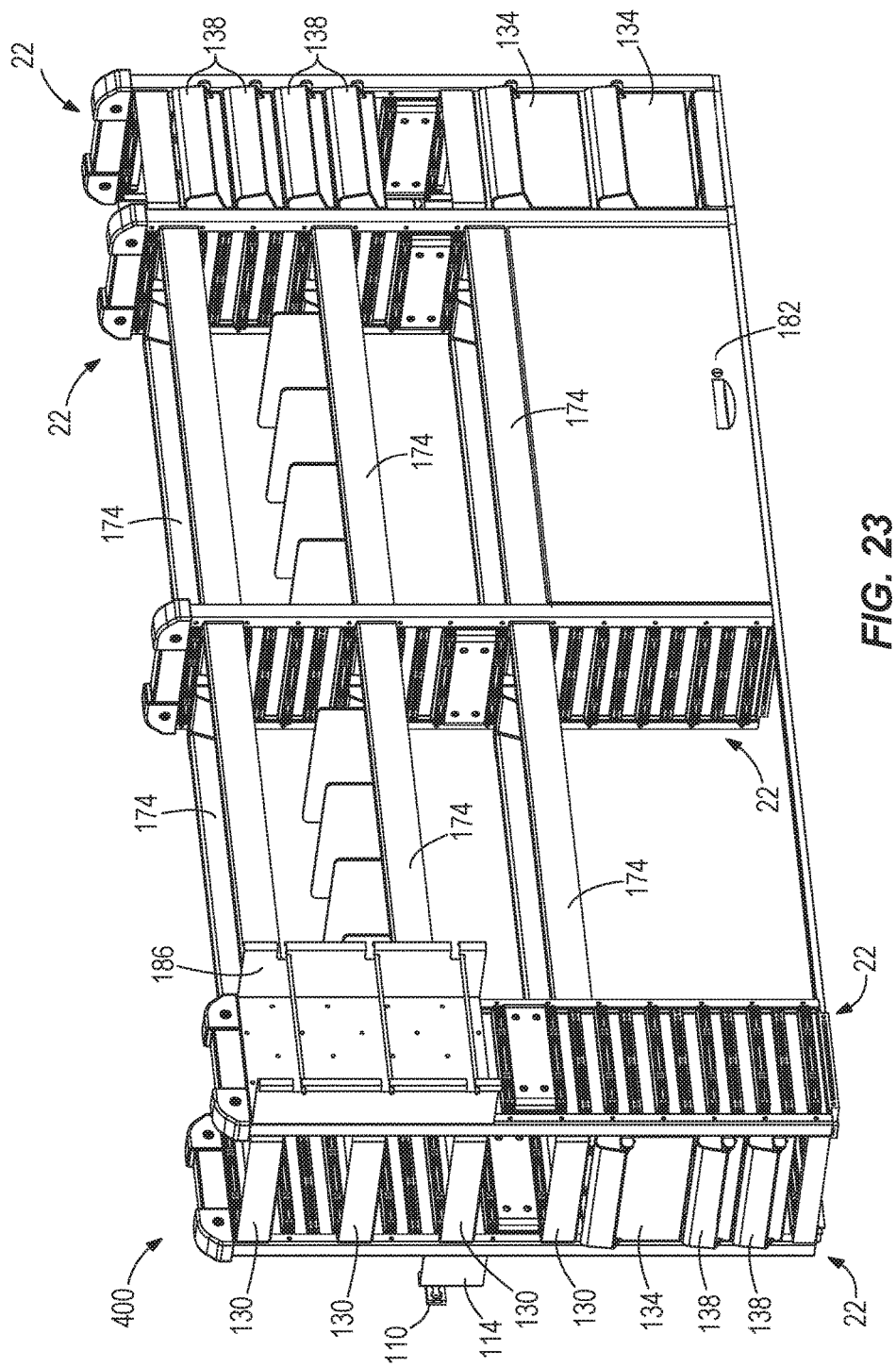
FIG. 23 is a front perspective view of a modular shelving assembly in accordance with a further embodiment of the invention.
Figure 24:
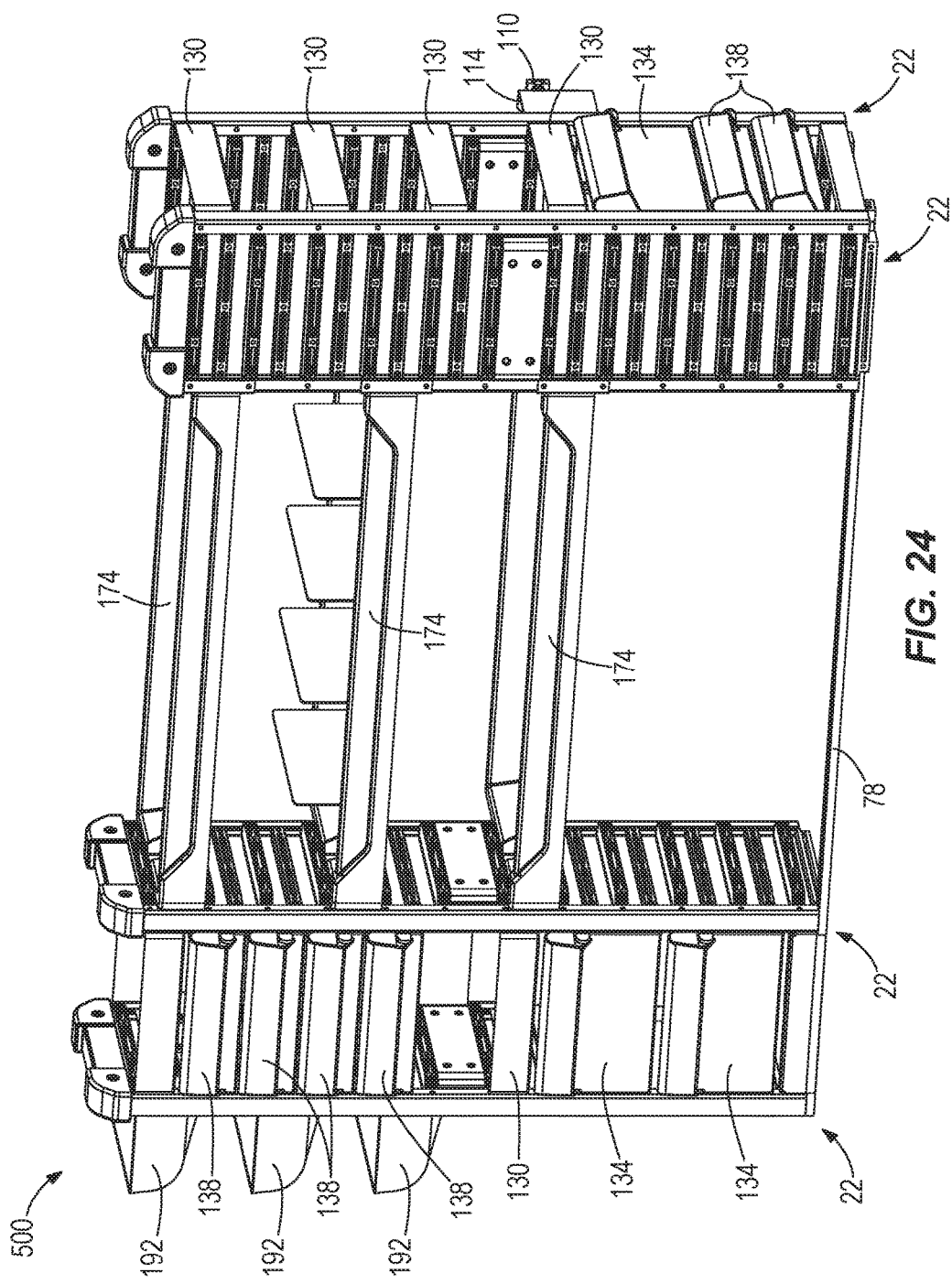
FIG. 24 is a front perspective view of a modular shelving assembly in accordance with another embodiment of the invention.
Figure 26:
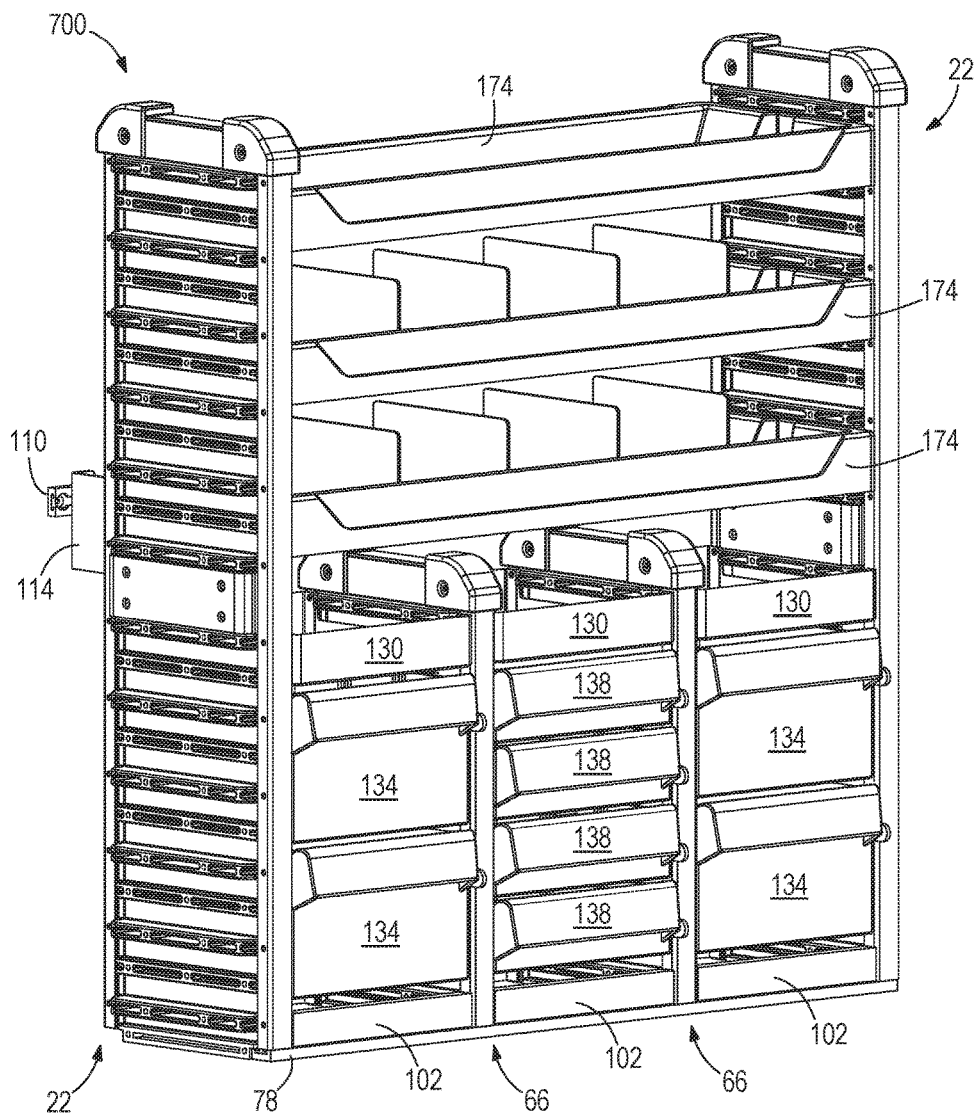
FIG. 26 is a perspective view of a modular shelving assembly in accordance with a further embodiment of the invention.

With reference to FIGS. 21-26, additional modular shelving assemblies according to other embodiments of the invention are illustrated with similar features identified with like reference numerals. Upright assemblies provide the building blocks for any number of different configurations to best accommodate the user. FIG. 21 illustrates a modular shelving assembly 200 according to one embodiment of the invention including the same upright assemblies 70 shown in FIG. 7C. One of the upright assemblies 70, rather than being used to create a cabinet, provides an intermediate support structure to which several shelves 174 are fastened. FIG. 22 illustrates a modular shelving assembly 300 according to another embodiment of the invention including the same upright assemblies 22 as those shown in FIGS. 1-5. FIG. 23 illustrates a modular shelving assembly 400 according to yet another embodiment of the invention including the same upright assemblies 22 as those shown in FIGS. 1-5, and further including accessories such as a swinging door 182 and a spool rack 186 for electrical wire. FIG. 24 illustrates a modular shelving assembly 500 according to a further embodiment of the invention including the same upright assemblies 22 as those shown in FIGS. 1-5, and further including accessories such as side troughs 192 to hold, for example, hardware components. FIG. 25 illustrates a modular shelving assembly 600 according to another embodiment of the invention including the upright assemblies 70 shown in FIG. 7C. The modular shelving assembly 600 is configured to carry multiple tanks T on the bottle racks 160. FIG. 26 illustrates a modular shelving assembly 700 according to yet another embodiment of the invention including only two upright assemblies 22 with multiple shelves 174 spanning between the upright assemblies 22, and multiple single-panel upright assemblies 66 below the shelves 174.

Figure 27:
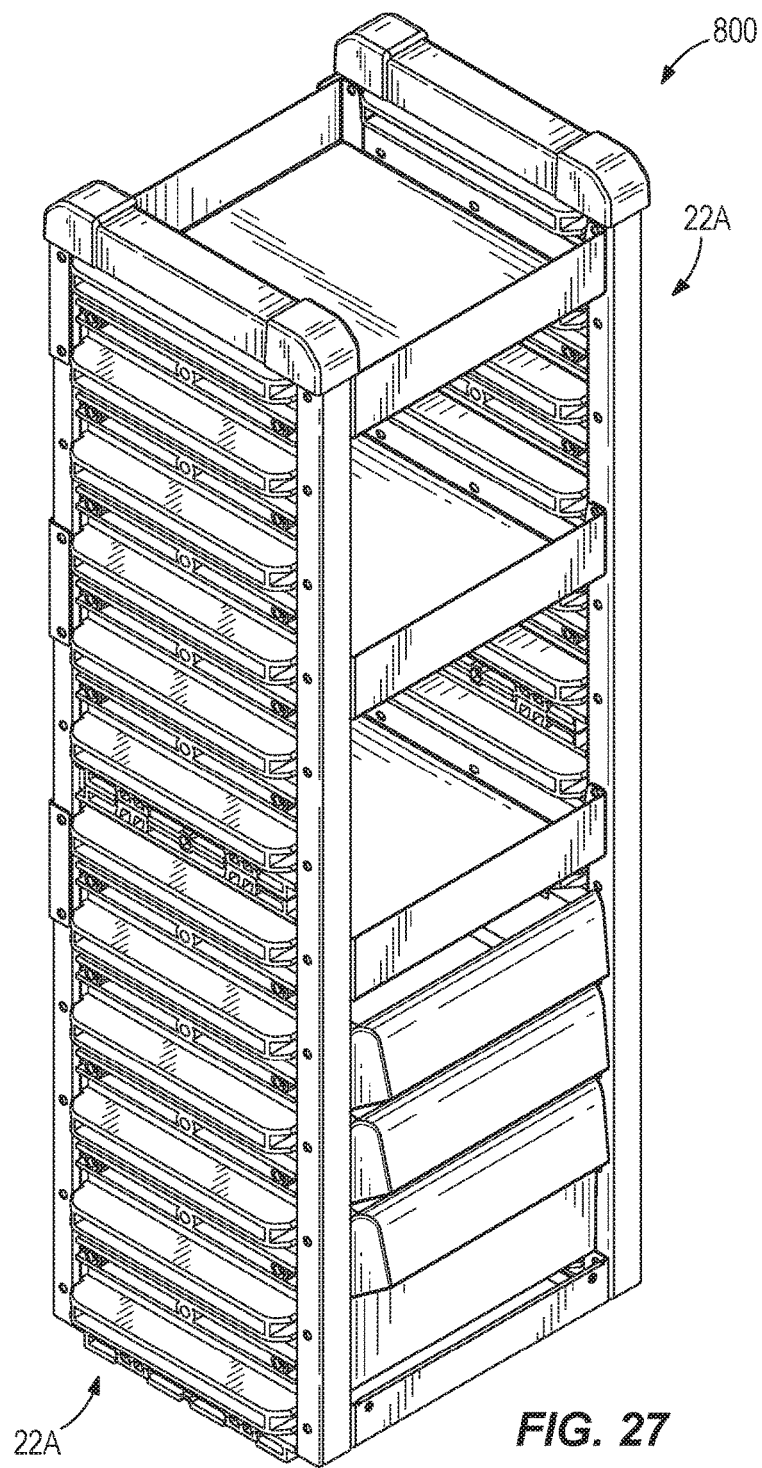
FIG. 27 is a perspective view of a cabinet including two upright assemblies of FIG. 4A.
Figure 28:
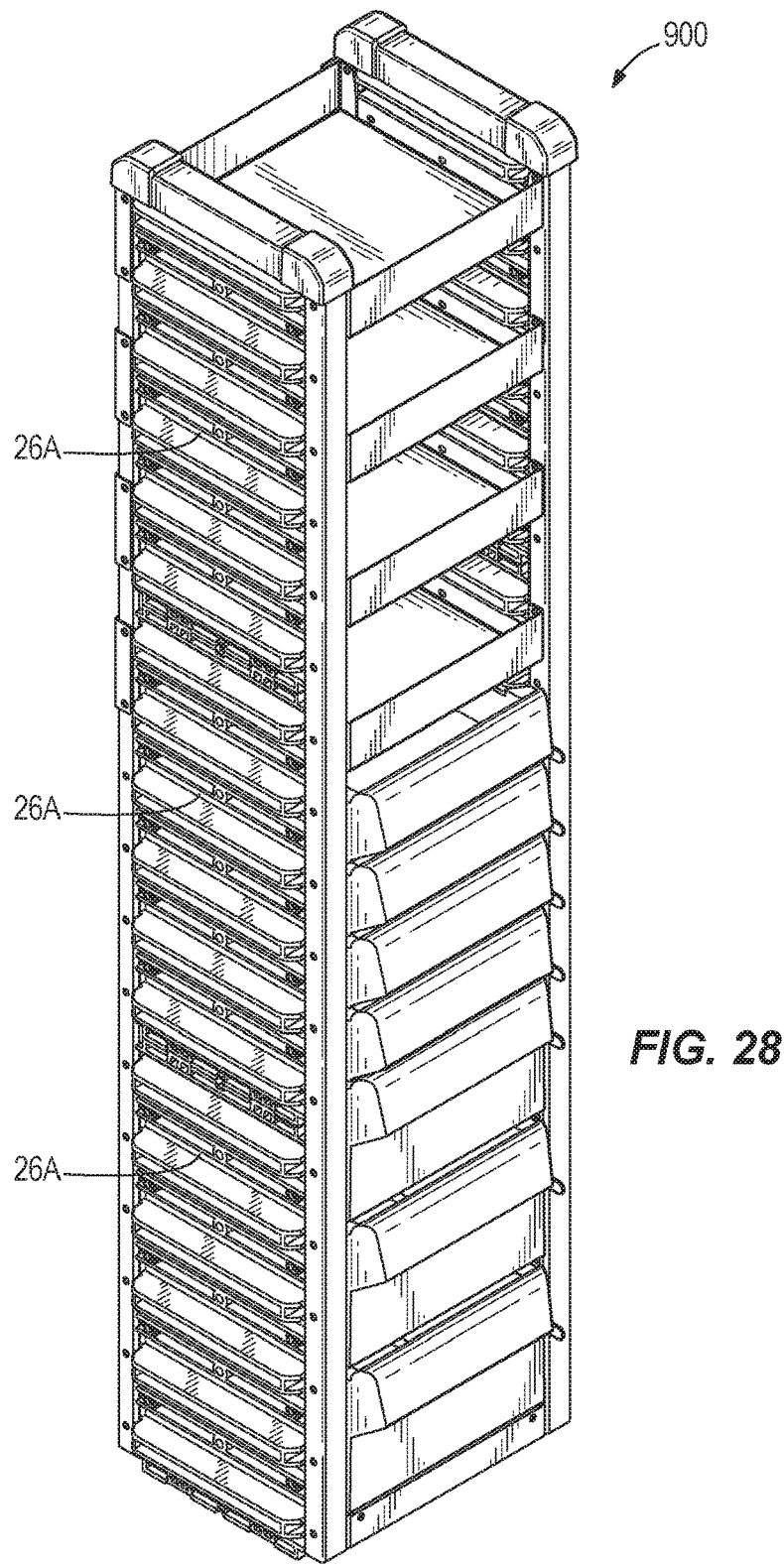
FIG. 28 is a perspective view of a cabinet in accordance with another embodiment of the invention.
Figure 29:
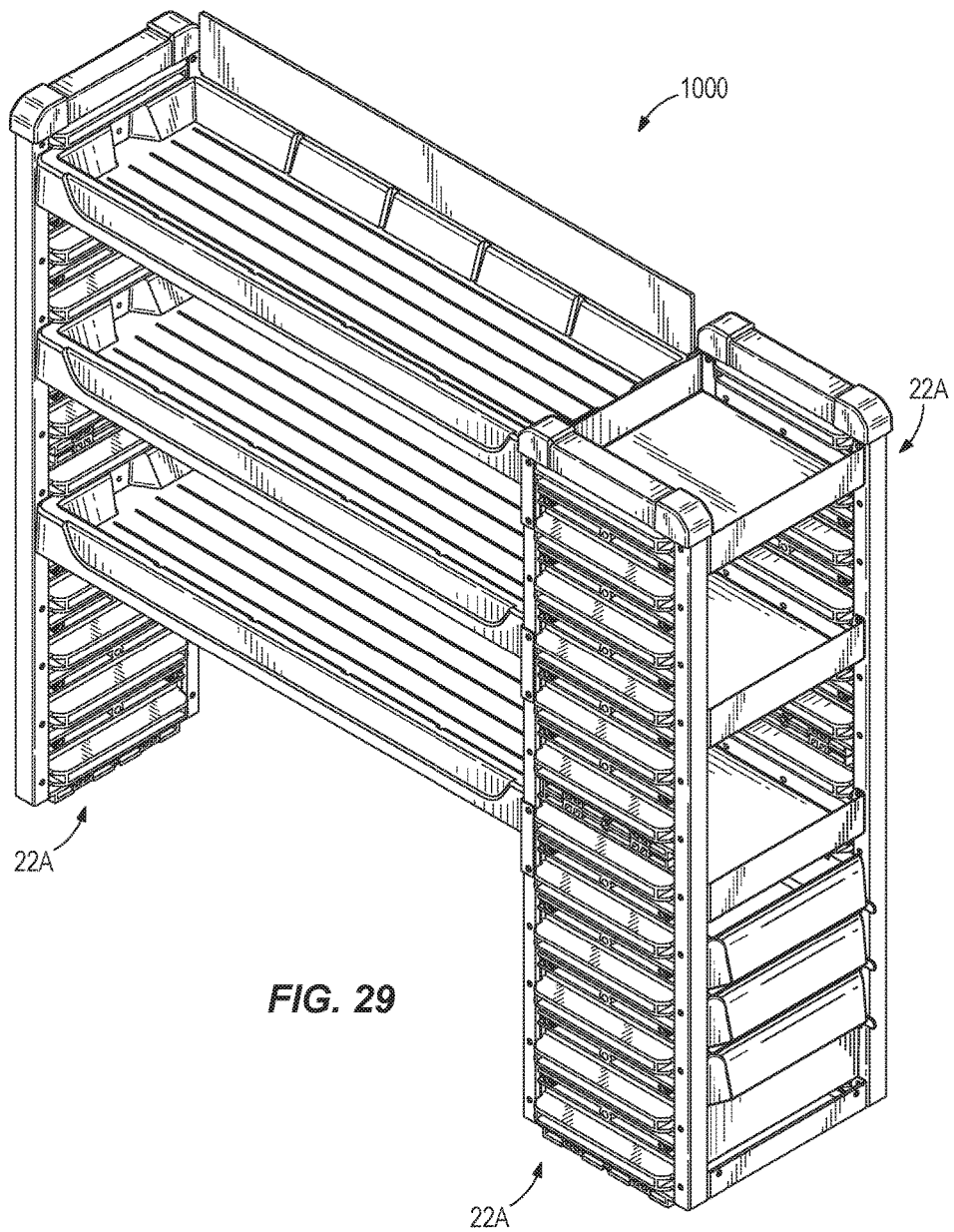
FIG. 29 is a front perspective view of a modular shelving assembly in accordance with yet another embodiment of the invention.
Figure 30:
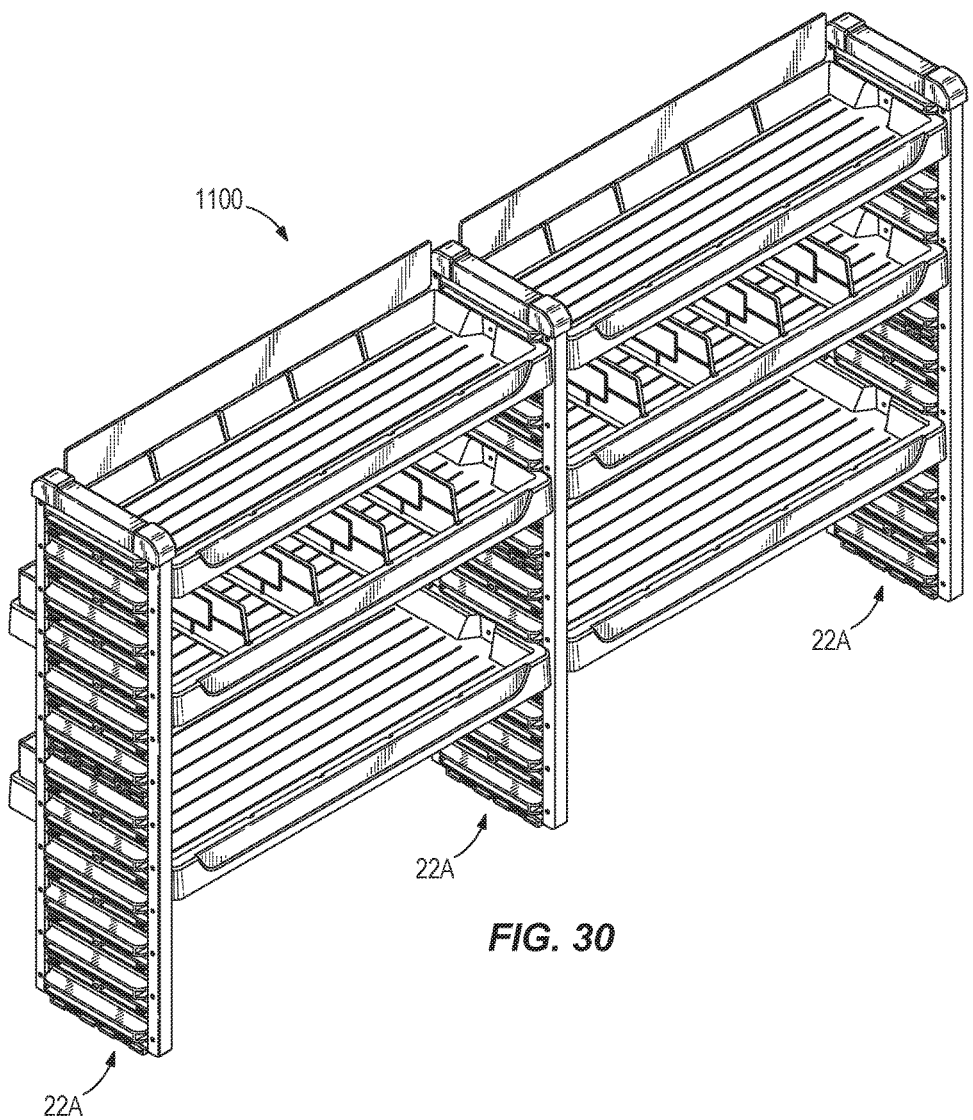
FIG. 30 is a front perspective view of a modular shelving assembly in accordance with a further embodiment of the invention.
Figure 31:
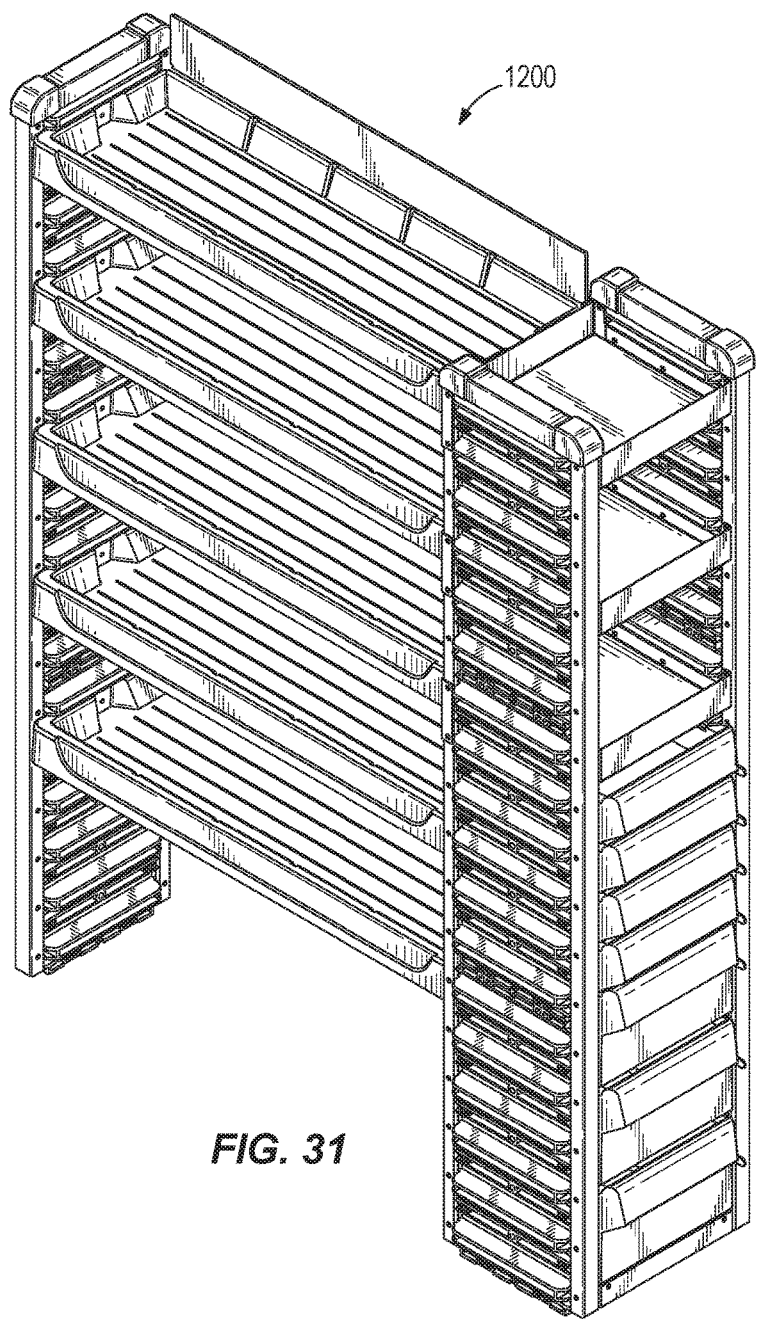
FIG. 31 is a front perspective view of a modular shelving assembly in accordance with another embodiment of the invention.
Figure 32:
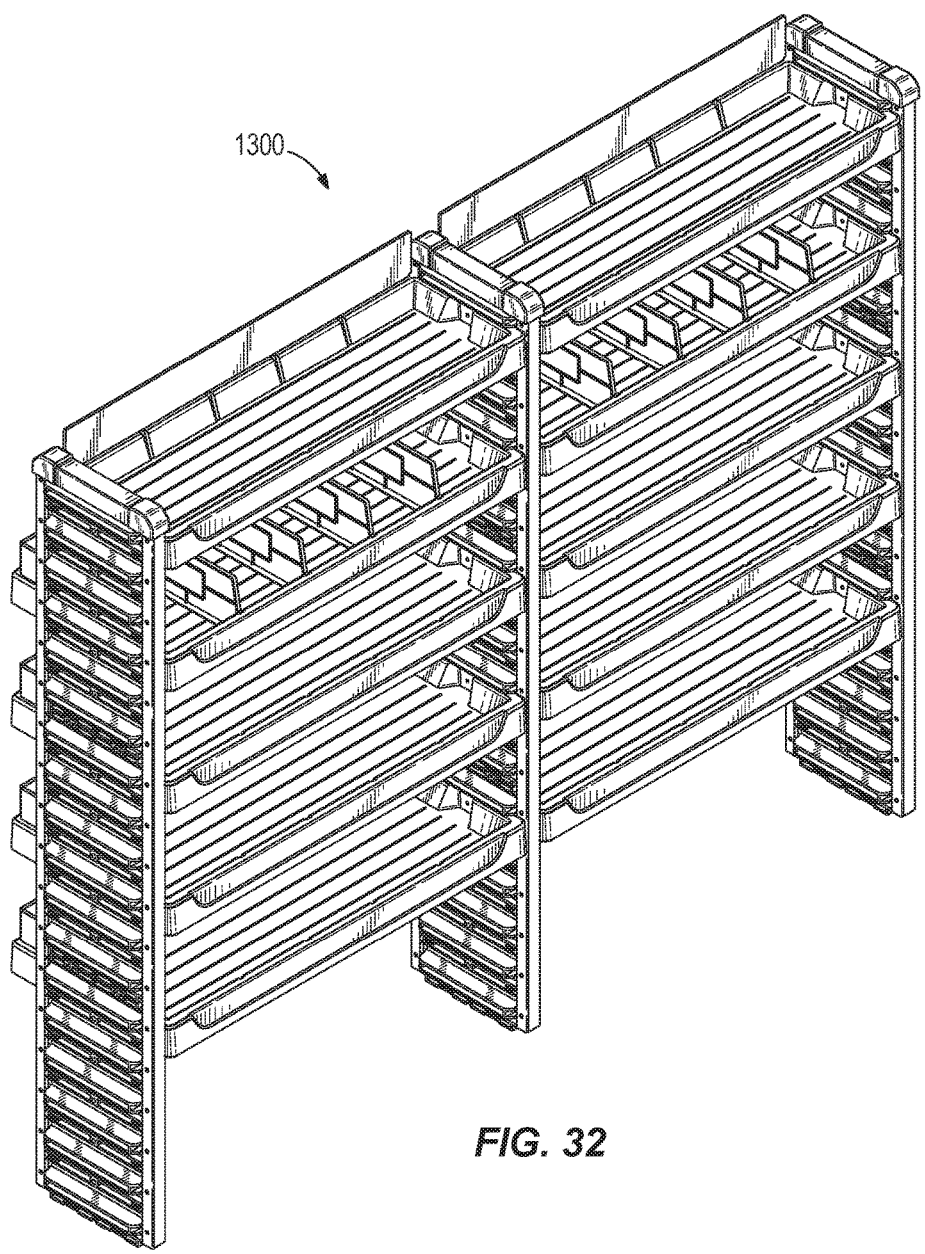
FIG. 32 is a front perspective view of a modular shelving assembly in accordance with yet another embodiment of the invention.
Figure 33:
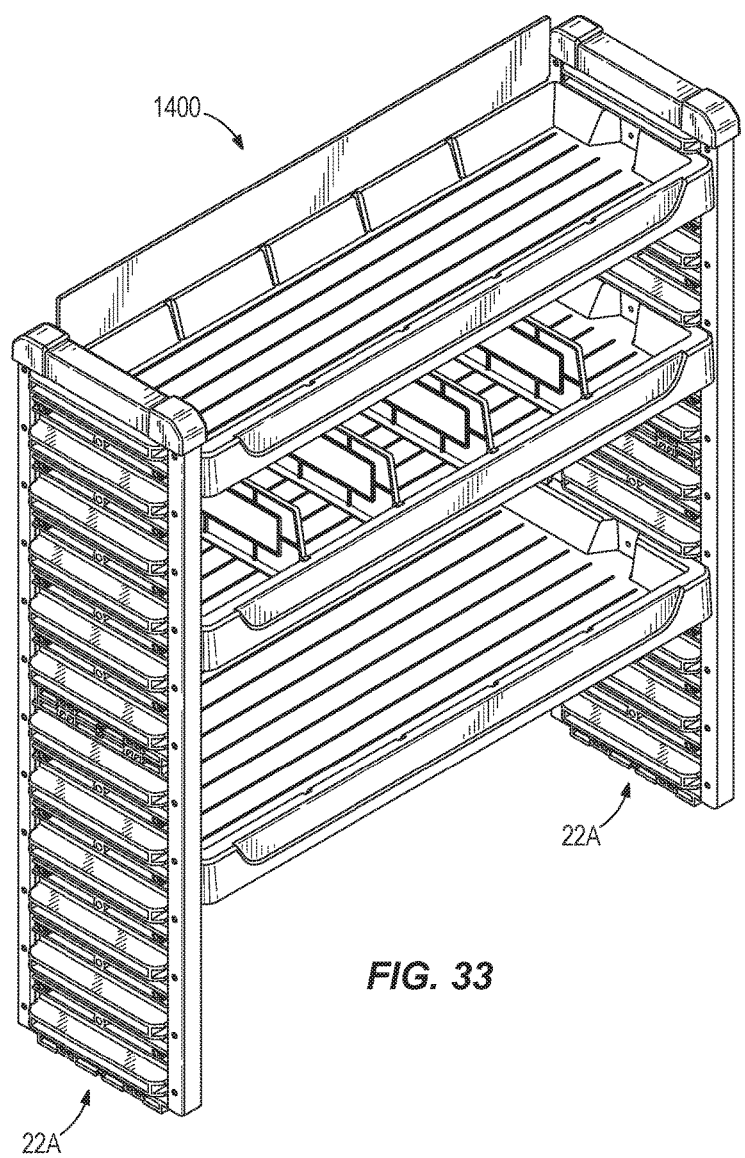
FIG. 33 is a front perspective view of a modular shelving assembly in accordance with further embodiment of the invention.
Figure 34:
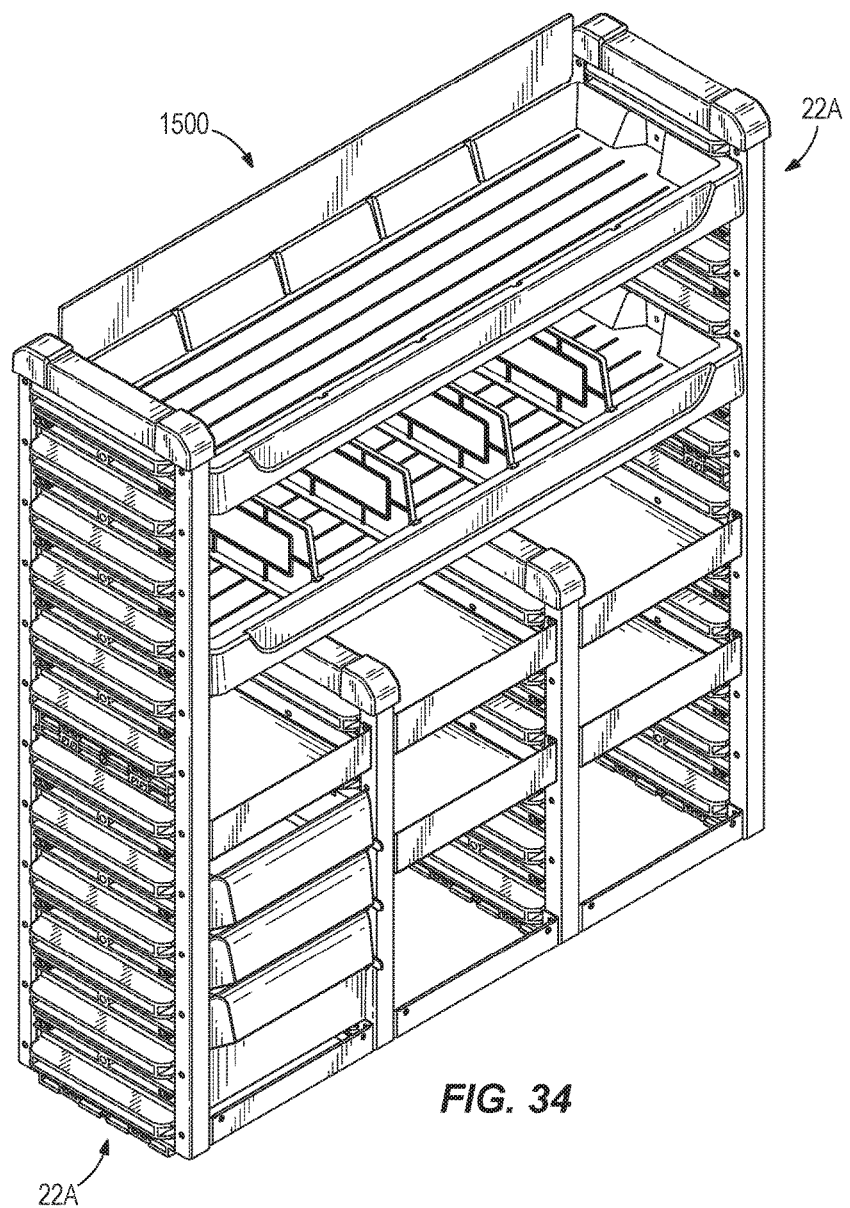
FIG. 34 is a front perspective view of a modular shelving assembly in accordance with another embodiment of the invention.
Figure 35:
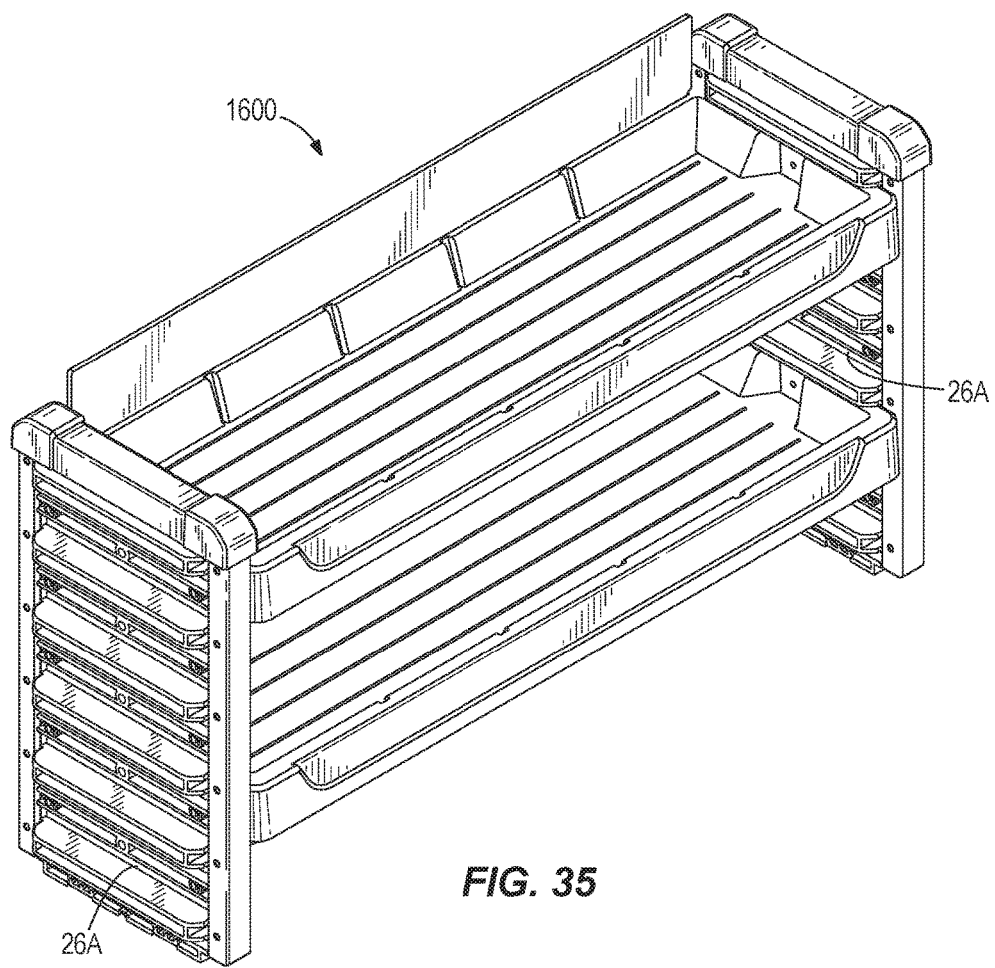
FIG. 35 is a front perspective view of a modular shelving assembly in accordance with yet another embodiment.

With reference to FIGS. 27-35, additional modular shelving assemblies according to other embodiments of the invention are illustrated with similar features identified with like reference numerals. The modular shelving assemblies of FIGS. 27-35 use upright assemblies formed from the panels 26A, shown in FIGS. 4A and 5A. FIG. 27 illustrates a modular shelving assembly 800 according to one embodiment of the invention including the same upright assemblies 22A shown in FIG. 4A. FIG. 28 illustrates a modular shelving assembly 900 according to yet another embodiment of the invention including upright assemblies having three panels 26A coupled together. FIG. 29 illustrates a modular shelving assembly 1000 according to another embodiment of the invention including three upright assemblies 22A. FIG. 30 illustrates a modular shelving assembly 1100 according to yet another embodiment of the invention including three upright assemblies 22A. FIG. 31 illustrates a modular shelving assembly 1200 according to another embodiment of the invention including upright assemblies each having three panels 26A. FIG. 32 illustrates a modular shelving assembly 1300 according to yet another embodiment of the invention including upright assemblies each having three panels 26A. FIG. 33 illustrates a modular shelving assembly 1400 according to another embodiment of the invention including two upright assemblies 22A. FIG. 34 illustrates a modular shelving assembly 1500 according to yet another embodiment of the invention including two upright assemblies 22A and two upright assemblies having a single panel 26A. FIG. 35 illustrates a modular shelving assembly 1600 according to another embodiment of the invention including two upright assemblies having a single panel 26A.

Figure 36:
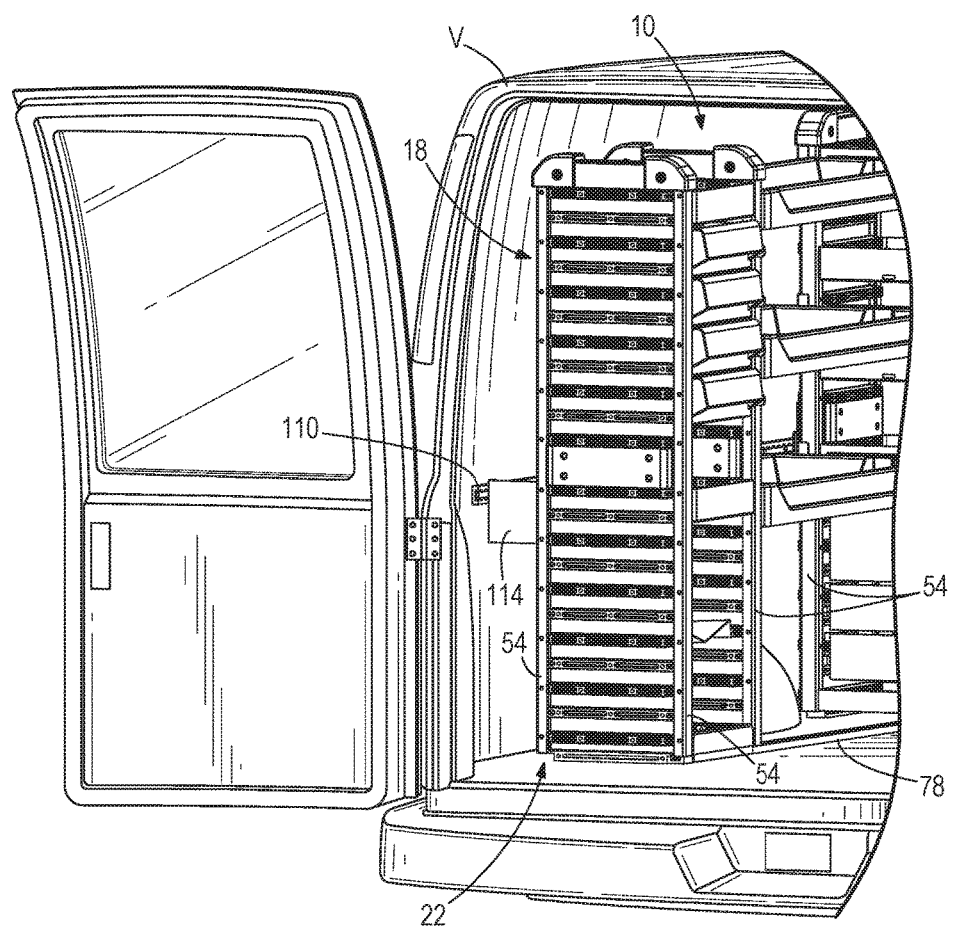
FIG. 36 is a perspective view of the modular shelving assembly of FIG. 1 installed in a cargo vehicle.

With reference to FIG. 36, an installation of the modular shelving assembly 10 is illustrated inside a cargo vehicle V, with the assembly 10 being oriented substantially parallel to a longitudinal axis of the vehicle V. The floor mounting rail 78 and the wall mounting rail 110 are shown attached to the floor and the side wall of the vehicle V, respectively.

As described above, the constituent parts of the shelving assembly 10 are reconfigurable and repositionable to create shelving assemblies of different shapes, sizes, and orientations depending upon the intended usage of the shelving assembly 10, while reducing the number of fasteners utilized in the assembly 10 compared to a traditional shelving assembly for use in a utility or cargo vehicle.

Various features of the invention are set forth in the following claims.

What is claimed is:

1. A modular shelving assembly for use in a vehicle including a cargo space at least partially defined by a floor and a side wall of the vehicle, the shelving assembly comprising:
    at least two interconnected upright assemblies, each including
        a first panel,
        a second panel, and
        a coupler member separate from and unitizing the first and second panels; and
    a rail secured to one of the floor and the side wall to which at least one of the interconnected upright assemblies is anchored;
    wherein the rail is a first rail secured to the floor, and wherein the modular shelving assembly further includes a second rail secured to the side wall to which at least one of the interconnected upright assemblies is anchored;
    wherein each of the first and second rails includes a channel, and wherein the shelving assembly further includes:
        a first fastener extending from the first rail and having a head slidably received within the channel of the first rail, and
        a second fastener extending from the second rail and having a head slidably received within the channel of the second rail.

2. The modular shelving assembly of claim 1, further comprising a first bracket secured to the first rail by the first fastener, wherein the first bracket is also secured to at least one of the upright assemblies, thereby anchoring the upright assembly to the vehicle floor.

3. The modular shelving assembly of claim 2, wherein the two upright assemblies are positioned side by side within the vehicle cargo space, and wherein the first bracket is secured to both of the upright assemblies, thereby anchoring the upright assemblies to the vehicle floor and interconnecting the upright assemblies to each other.

4. The modular shelving assembly of claim 3, wherein the first bracket includes first and second flanges, respectively, to which the two upright assemblies are fastened.

5. The modular shelving assembly of claim 2, wherein the first bracket includes first and second flanges both fastened to one of the upright assemblies.

6. The modular shelving assembly of claim 2, wherein the first bracket includes a slot through which the first fastener extends, wherein the slot is elongated in a length dimension of the first rail, thereby permitting the first bracket to be adjustable relative to the first rail along the length of the first rail.

7. The modular shelving assembly of claim 2, further comprising a second bracket secured to the second rail by the second fastener, wherein the second bracket is also secured to at least one of the upright assemblies, thereby anchoring the upright assembly to the vehicle side wall.

8. The modular shelving assembly of claim 1, further comprising a cargo supporting member interconnecting the at least two upright assemblies.

9. The modular shelving assembly of claim 8, wherein the cargo supporting member is configured as one of a drawer, a shelf, and a rack.

10. The modular shelving assembly of claim 9, wherein the cargo supporting member is configured as a drawer, and wherein the modular shelving assembly further includes a shelf interconnecting the at least two upright assemblies.

11. The modular shelving assembly of claim 1, wherein the coupler member unitizes the first and second panels in an end-to-end configuration.

12. The modular shelving assembly of claim 11, wherein at least two of the interconnected upright assemblies further includes
    a third panel, and
    a second coupler member unitizing the second and third panels in an end-to-end configuration.

13. The modular shelving assembly of claim 11, wherein the coupler member is configured as an I-beam.

14. The modular shelving assembly of claim 11, wherein the coupler member is configured as a C-channel.

15. The modular shelving assembly of claim 1, wherein each of the upright assemblies includes
    a first vertical support channel extending along a first edge of the first panel and a first edge of the second panel, and
    a second vertical support channel extending along a second edge of the first panel and a second edge of the second panel.

16. The modular shelving assembly of claim 15, wherein the first and second vertical support channels are fastened to the first and second panels, thereby unitizing the first and second panels.

17. The modular shelving assembly of claim 15, wherein the coupler member is one of the first and second vertical support channels.

18. The modular shelving assembly of claim 1, wherein the at least two upright assemblies comprise first and second upright assemblies, wherein the modular shelving assembly further includes third and fourth interconnected upright assemblies, each of which is substantially identical to the first and second upright assemblies, and wherein at least one of the third and fourth upright assemblies is anchored to the rail.

19. The modular shelving assembly of claim 18, wherein the first and second upright assemblies comprise a first cabinet, and wherein the third and fourth upright assemblies comprise a second cabinet oriented substantially transversely to the first cabinet.

* * * * *